(12) United States Patent
Naaman et al.

(10) Patent No.: US 11,445,051 B2
(45) Date of Patent: Sep. 13, 2022

(54) CONFIGURABLE PARSER AND A METHOD FOR PARSING INFORMATION UNITS

(71) Applicant: Amazon Technologies, Inc., Seattle, WA (US)

(72) Inventors: Ofer Naaman, Hod-Hasharon (IL); Erez Izenberg, Tel Aviv (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 17/247,147

(22) Filed: Dec. 1, 2020

(65) Prior Publication Data

US 2021/0084128 A1 Mar. 18, 2021

Related U.S. Application Data

(63) Continuation of application No. 16/435,266, filed on Jun. 7, 2019, now Pat. No. 10,863,009, which is a
(Continued)

(51) Int. Cl.
*H04L 69/22* (2022.01)
*H04L 49/90* (2022.01)
(Continued)

(52) U.S. Cl.
CPC .............. *H04L 69/22* (2013.01); *G06F 16/00* (2019.01); *G06F 16/134* (2019.01);
(Continued)

(58) Field of Classification Search
CPC ......... H04L 69/22; H04L 45/38; H04L 45/74; H04L 47/10; H04L 47/2433; H04L 49/602; H04L 49/90; H04L 69/02; H04L 69/12; H04L 69/16; H04L 1/0066; H04L 47/125; G06F 16/00; G06F 16/134; G06F 16/182; G06F 16/245; G06F 16/2471; G06F 16/254; G06F 16/90; G06F 16/90344; G06F 9/3001; G06F 13/385; Y02D 10/00

See application file for complete search history.

(56) References Cited

U.S. PATENT DOCUMENTS 6,356,951 B1  3/2002  Gentry, Jr.
6,650,640 B1  11/2003  Muller et al.
(Continued)

OTHER PUBLICATIONS

U.S. Appl. No. 14/027,257 , "Final Office Action", dated Jan. 25, 2016, 24 pages.
(Continued)

*Primary Examiner* — Jae Y Lee
(74) *Attorney, Agent, or Firm* — Weaver Austin Villeneuve & Sampson LLP

(57) ABSTRACT

A packet processing technique can include selecting a protocol field from the packet, and performing a comparison of the selected protocol field with comparison data in a compare logic array to output a protocol index. The protocol index can be used as an address to read parsing commands from a parse control table, and a parse result can be generated based on executing the parsing commands on the packet. The parse results are used to derive a parse result vector, which can be used by a forwarding engine to forward the packet.

20 Claims, 17 Drawing Sheets

Related U.S. Application Data continuation of application No. 14/594,137, filed on Jan. 11, 2015, now Pat. No. 10,320,956, which is a continuation-in-part of application No. 14/027,257, filed on Sep. 16, 2013, now Pat. No. 9,444,914.

(51) Int. Cl.

| | |
|---|---|
| *H04L 49/60* | (2022.01) |
| *H04L 45/00* | (2022.01) |
| *H04L 45/74* | (2022.01) |
| *H04L 47/2425* | (2022.01) |
| *H04L 47/10* | (2022.01) |
| *G06F 16/182* | (2019.01) |
| *G06F 16/245* | (2019.01) |
| *G06F 16/00* | (2019.01) |
| *G06F 16/13* | (2019.01) |
| *G06F 16/90* | (2019.01) |
| *G06F 16/25* | (2019.01) |
| *G06F 16/2458* | (2019.01) |
| *G06F 16/903* | (2019.01) |
| *H04L 69/00* | (2022.01) |
| *H04L 69/12* | (2022.01) |
| *H04L 69/16* | (2022.01) |
| *H04L 1/00* | (2006.01) |
| *G06F 9/30* | (2018.01) |
| *G06F 13/38* | (2006.01) |
| *H04L 47/125* | (2022.01) |

(52) U.S. Cl.
CPC .......... *G06F 16/182* (2019.01); *G06F 16/245* (2019.01); *G06F 16/2471* (2019.01); *G06F 16/254* (2019.01); *G06F 16/90* (2019.01); *G06F 16/90344* (2019.01); *H04L 45/38* (2013.01); *H04L 45/74* (2013.01); *H04L 47/10* (2013.01); *H04L 47/2433* (2013.01); *H04L 49/602* (2013.01); *H04L 49/90* (2013.01); *H04L 69/02* (2013.01); *H04L 69/12* (2013.01); *H04L 69/16* (2013.01); *G06F 9/3001* (2013.01); *G06F 13/385* (2013.01); *H04L 1/0066* (2013.01); *H04L 47/125* (2013.01); *Y02D 10/00* (2018.01)

(56) References Cited

U.S. PATENT DOCUMENTS

| | | |
|---|---|---|
| 6,678,746 B1 | 1/2004 | Russell et al. |
| 6,708,233 B1 | 3/2004 | Fuller et al. |
| 6,847,645 B1 | 1/2005 | Potter et al. |
| 7,188,168 B1 | 3/2007 | Liao et al. |
| 7,529,943 B1 | 5/2009 | Beser |
| 7,685,254 B2 | 3/2010 | Pandya |
| 8,085,780 B1 | 12/2011 | Lim et al. |
| 8,284,776 B2 | 10/2012 | Petersen |
| 8,638,793 B1 | 1/2014 | Ben-Mayor et al. |
| 8,743,877 B2 | 6/2014 | Pope et al. |
| 8,898,204 B1 | 11/2014 | Sathe et al. |
| 9,444,914 B2 | 9/2016 | Izenberg |
| 9,565,114 B1 | 2/2017 | Kabbani et al. |
| 9,930,150 B2 | 3/2018 | Izenberg |
| 10,320,956 B2 | 6/2019 | Naaman et al. |
| 10,742,779 B2 | 8/2020 | Izenberg |
| 10,863,009 B2 | 12/2020 | Naaman et al. |
| 2002/0073234 A1 | 6/2002 | Ma |
| 2002/0184489 A1 | 12/2002 | Mraz |
| 2003/0097481 A1 | 5/2003 | Richter |
| 2003/0108038 A1 | 6/2003 | Devanagondi et al. |
| 2003/0195973 A1* | 10/2003 | Savarda ............... H04L 69/16 709/230 |
| 2004/0100972 A1* | 5/2004 | Lumb ............... H04L 63/0227 370/252 |
| 2004/0120349 A1 | 6/2004 | Border et al. |
| 2004/0153494 A1 | 8/2004 | Mukund et al. |
| 2005/0004908 A1 | 1/2005 | Ben-Haim et al. |
| 2005/0276216 A1 | 12/2005 | Vasseur et al. |
| 2006/0039372 A1 | 2/2006 | Sarkinen et al. |
| 2006/0262783 A1 | 11/2006 | Nedeltchev |
| 2007/0047457 A1 | 3/2007 | Harijono et al. |
| 2008/0034147 A1 | 2/2008 | Stubbs et al. |
| 2009/0092136 A1 | 4/2009 | Nazareth et al. |
| 2009/0201935 A1* | 8/2009 | Hass ............... H04L 45/7453 370/395.32 |
| 2010/0057932 A1 | 3/2010 | Pope et al. |
| 2011/0069719 A1 | 3/2011 | Fries, IV et al. |
| 2011/0238792 A1 | 9/2011 | Phillips et al. |
| 2011/0268119 A1 | 11/2011 | Pong et al. |
| 2012/0155494 A1 | 6/2012 | Basso et al. |
| 2012/0210142 A1* | 8/2012 | Ichiki ............... H04L 12/4641 713/300 |
| 2012/0226804 A1 | 9/2012 | Raja et al. |
| 2012/0243540 A1 | 9/2012 | Lu |
| 2013/0080651 A1 | 3/2013 | Pope et al. |
| 2013/0117847 A1 | 5/2013 | Friedman et al. |
| 2013/0215906 A1 | 8/2013 | Hidai et al. |
| 2014/0208069 A1 | 7/2014 | Wegener et al. |
| 2014/0244966 A1 | 8/2014 | Bosshart et al. |
| 2014/0269762 A1* | 9/2014 | Voit ............... H04L 69/18 370/466 |
| 2015/0081726 A1 | 3/2015 | Izenberg |
| 2015/0189047 A1 | 7/2015 | Naaman et al. |
| 2017/0104852 A1 | 4/2017 | Izenberg |

OTHER PUBLICATIONS

U.S. Appl. No. 14/027,257, "Non-Final Office Action", dated Jul. 17, 2015, 20 pages.
U.S. Appl. No. 14/027,257, "Notice of Allowance", dated Jun. 8, 2016, 14 pages.
U.S. Appl. No. 14/027,257, "Notice of Allowance", dated May 18, 2016, 16 pages.
U.S. Appl. No. 14/594,137, "Advisory Action", dated Dec. 13, 2018, 5 pages.
U.S. Appl. No. 14/594,137, "Final Office Action", dated Aug. 8, 2018, 14 pages.
U.S. Appl. No. 14/594,137, "Non-Final Office Action", dated Dec. 28, 2017, 13 pages.
U.S. Appl. No. 14/594,137, "Notice of Allowance", dated Jan. 24, 2019, 9 pages.
U.S. Appl. No. 15/263,089, "Non Final Office Action", dated Apr. 10, 2017, 31 pages.
U.S. Appl. No. 15/263,089, "Notice of Allowance", dated Nov. 29, 2017, 11 pages.
U.S. Appl. No. 15/934,883, "Non-Final Office Action", dated May 30, 2019, 24 pages.
U.S. Appl. No. 15/934,883, "Final Office Action", dated Nov. 26, 2019, 20 pages.
U.S. Appl. No. 15/934,883, "Notice of Allowance", dated Mar. 30, 2020, 8 pages.
U.S. Appl. No. 16/435,266, "Notice of Allowance", dated Aug. 5, 2020, 17 pages.
Jonnalagedda et al., "Staged parser combinators for efficient data processing", InAcm Sigplan Notices, vol. 49, No. 10 ACM, Oct. 15, 2014, pp. 637-653.
Jung et al., "A dynamic construction algorithm for the Compact Patricia trie using the hierarchical structure", Information processing & management, vol. 38, No. 2, 2002, pp. 221-236.

* cited by examiner

| Source_VLAN_config | Add | De | Input Packet Format | Output Packet Format |
|---|---|---|---|---|
| 00 | 1 | 0 | DA SA Data | DA SA VLAN 1 new Data |
| 00 | 2 | 0 | DA SA Data | DA SA VLAN 1 new VLAN 2 new Data |
| 01 | 1 | 0 | DA SA VLAN 1 Data | DA SA VLAN 1 new VLAN 1 Data |
| 01 | 1 | 1 | DA SA VLAN 1 Data | DA SA VLAN 1 new Data |
| 01 | 2 | 1 | DA SA VLAN 1 Data | DA SA VLAN 1 new VLAN 2 new Data |
| 01 | 2 | 0 | DA SA VLAN 1 Data | DA SA VLAN 1 new VLAN 2 new VLAN 1 Data |
| 10 | 1 | 1 | DA SA VLAN 1 VLAN 2 Data | DA SA VLAN 1 new VLAN 2 Data |
| 10 | 2 | 2 | DA SA VLAN 1 VLAN 2 Data | DA SA VLAN 1 new VLAN 2 new Data |

CONFIGURABLE PARSER AND A METHOD FOR PARSING INFORMATION UNITS

CROSS REFERENCE TO RELATED APPLICATIONS

This application is a continuation of U.S. patent application Ser. No. 16/435,266, filed Jun. 7, 2019, issued as U.S. Pat. No. 10,863,009 on Dec. 8, 2020, and titled "GENERIC DATA INTEGRITY CHECK", which is a continuation of U.S. patent application Ser. No. 14/594,137, filed Jan. 11, 2015, issued as U.S. Pat. No. 10,320,956 on Jun. 11, 2019, and titled "GENERIC DATA INTEGRITY CHECK", which is a continuation-in-part of U.S. patent application Ser. No. 14/027,257, filed Sep. 16, 2013, issued as U.S. Pat. No. 9,444,914 on Sep. 13, 2016, and titled "CONFIGURABLE PARSER AND A METHOD FOR PARSING INFORMATION UNITS", all of which are incorporated herein by reference in their entireties.

BACKGROUND

Converged Network Adapter supports reception and transmission of multiple protocols at the same time, in some cases the protocols are encapsulated using tunneling protocols (for example Fibre Channel over Ethernet (FCoE), Internet Protocol (IP) over IP, Generic Routing Encapsulation (GRE), and the like), proprietary protocols and packet formats are also used together with standard protocols.

There is a growing need to provide protection to data transmitted and to provide end-to-end data integrity using a protocol out of a plurality of available protocols.

SUMMARY

According to an embodiment of the invention various methods may be provided and may be described in the specification. Additional embodiments of the invention include a system configured to execute any or all of the methods.

According to an embodiment of the invention a system may be provide and may include a configurable parser that may include one or more configurable parsing engines, wherein the configurable parser may be arranged to receive a packet and to extract from the packet headers associated with a set of protocols that may include at least one protocol; a packet type detection unit that may be arranged to determine a type of the packet in response to the set of protocols; and a configurable data integrity unit that may include a configuration unit and at least one configurable data integrity engine; wherein the configuration unit may be arranged to configure the at least one configurable data integrity engine according to the set of protocols; and wherein the at least one configurable data integrity engine may be arranged to perform data integrity processing of the packet to provide at least one data integrity result. The parser may be a hardware processor (CPU, DSP, FPGA) or be executed by such a hardware processor.

The at least one configurable data integrity engine may include multiple configurable data integrity engines.

The set of protocol may include a plurality of protocols and wherein the configuration unit may be arranged to configure different configurable data integrity engines of the multiple configurable data integrity engines to different protocols of the plurality of protocols.

The at least two configurable data integrity engines of the multiple configurable data integrity engines may be arranged to perform data integrity processing in parallel to each other.

The configuration unit may be arranged to configure the multiple configurable data integrity engines by providing to each configurable data engine configuration information.

The configuration information may include masking information for masking bits of the packet.

The configuration information may include masking information for (a) masking variant bits of the packet that may be changed during a propagation of the packet through a network, and for (b) unmasking non-variant bits of the packet.

The system may be arranged to perform an end-to-end data integrity check.

The system may be arranged to perform the end-to-end data integrity check by ignoring variant bits of the packet that may be changed during a propagation of the packet through a network and processing non-variant bits of the packet that may be expected not to be changed during the propagation of the packet through the network.

The configurable data integrity unit may be coupled between a media access control module and a communication endpoint adaptor.

The configurable parser may include multiple configurable parsing engines; wherein different portions of an information unit may be processed by different configurable parsing engines; and wherein at least one configurable parsing engine may be configured to (a) process of a portion of the information unit in response to at least previous processing result provided from a previous configurable parsing engine; and to (b) generate a current processing result to be used by a next configurable parsing engine.

The multiple configurable parsing engines and concatenating modules form a first interleaved sequence; wherein each parsing engine may be followed by a concatenating module.

According to an embodiment of the invention there may be provided a method that may include receiving a packet; detecting, by a configurable parser, a type of the packet that may be indicative of a protocol set that may be associated with the packet; wherein the configurable parser may include a configurable data integrity unit; extracting and parsing, by the configurable parser, each header of each protocol of the set of protocols; configuring one or more data integrity engines of the configurable data integrity unit according to the type of the packet; wherein the configuring may be executed by a configuration unit of the configurable data integrity unit; extracting from the packet at least one packet portion to be data integrity processed; performing, by at least one configurable data engine of the configurable parser, data integrity processing of the extracted one or more portion of the packet to provide data integrity results; and responding to the data integrity results.

The set of protocol may include a plurality of protocols; wherein the one or more data integrity engines may include multiple data integrity engines; wherein the configuring of the one or more configurable data integrity engine may include configuring different configurable data integrity engines of the plurality of configurable data integrity engines to different protocols of the multiple protocols.

The performing of the data integrity processing may include performing by at least two configurable data integrity engines of the multiple configurable data integrity engines integrity processing in parallel to each other.

The method may include configuring the multiple configurable data integrity engines by providing to each configurable data engine configuration information.

The configuration information may include masking information for masking bits of the packet.

The configuration information may include masking information for (a) masking variant bits of the packet that may be changed during a propagation of the packet through a network, and for (b) unmasking non-variant bits of the packet.

The data integrity results may be indicative of an outcome of an end-to-end data integrity check.

The method may include ignoring variant bits of the packet that may be changed during a propagation of the packet through a network and processing non-variant bits of the packet that may be expected not to be changed during the propagation of the packet through the network.

The configurable parser may include multiple configurable parsing engines; wherein different portions of an information unit may be processed by different configurable parsing engines; and the method may include (a) processing, by a configurable parsing engine, a portion of the information unit in response to at least previous processing result provided from a previous configurable parsing engine; and to (b) generating, by the configurable parsing engine, a current processing result to be used by a next configurable parsing engine.

The multiple configurable parsing engines and concatenating modules may form a first interleaved sequence; wherein each parsing engine may be followed by a concatenating module.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates various examples of frames that were modified by the programmable header builder according to various embodiments of the invention;

Figure 1:
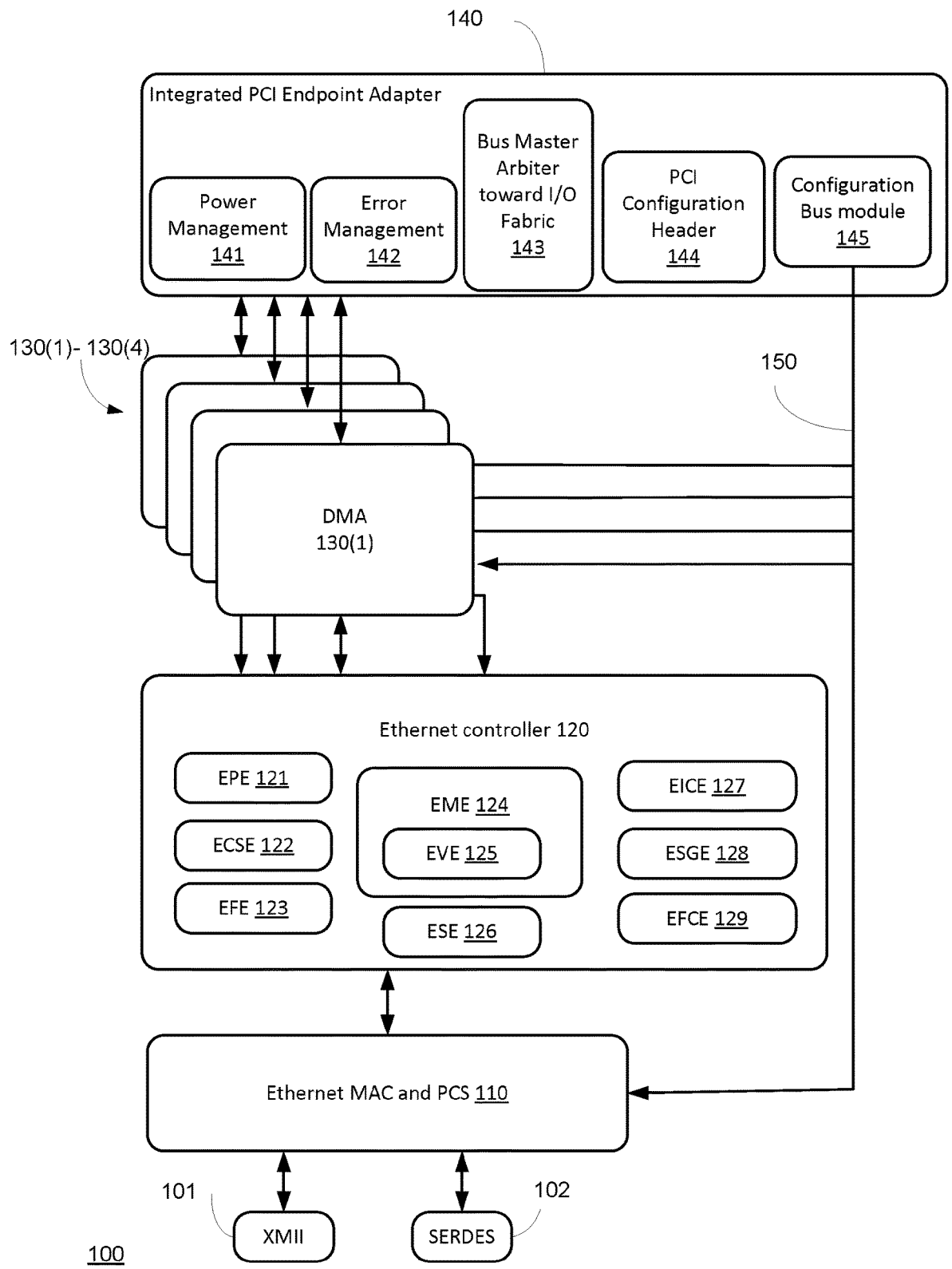
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

MAC stands for media access control.
DMA stands for direct access memory.
PCS stands for
PCI stands for Peripheral Component Interconnect.
PMA stands for program memory area.
TX stands for transmit.
RX stands for receive.
TCP stands for transmission control protocol.
UDP stands for user datagram protocol.

IPv4 stands for Internet Protocol version 4.
CPU stands for central processing unit.
ALU stands for algorithmic processing unit.
OS stands for operating system.
VLAN stands for virtual local access network.

In the following text some examples refer to Cyclic Redundancy Check (CRC). The CRC is provided only as a non-limiting example of a data integrity process.

Network equipment that uses the network adapter as end user (such as compute or storage servers) and network equipment that forward packets (such as switches and routers) sometimes preforms packet processing which include modification of some packet fields.

Network equipment can also calculate and modify Cyclic Redundancy Check (CRC) and checksum fields when performing packet processing.

It is common for network adapter to perform byte crunching operations like CRC and checksum to reduce software and/or Central Processing Unit (CPU) and memory load. For example:
a. Ethernet layer two frame check sequence (L2 PCS) is calculated in the Media Access Control (MAC) logic in the network adapter (inserted in a transmitted packet and verified in a received packet).
b. Layer 3 Internet protocol version 4—(L3 Pv4) checksum.
c. Layer 4 Transmission Control Protocol (L4 TCP) checksum.

Additional network protocols adds more CRC fields that are used to protect the packet header and payload, these protocol can be used together with standard L2/L3/L4 protocols and can also be encapsulated with tunneling protocols (such as GRE).

Examples for such additional protocols include FCoE (Fiber Channel over Ethernet) and RoCE (RDMA over converged Ethernet).

Different protocols may also use different CRC calculations (polynomials) for example—CRC32 vs CRC32c.

There may be also a need to add additional fields that can also be used for end-to-end integrity checks, these are used to verify that the payload and some of the header fields are not changed when the packet is forwarded through the network.

Note that some of the packet data and header fields can be modified, the end-to-end integrity check is used to verify that the while some fields are modified the relevant fields (data and header) are not changed.

The integrity function can be CRC or HMAC (Hash based Message Authentication Code), Secure Hash Algorithm (SHA) etc.

Any additional standard or proprietary protocol can introduce additional protection (or data integrity) fields with different integrity functions such as CRC, HMAC, etc. The usage of these additional protection fields is to provide more protection for specific fields, payload or both.

Additional protection fields can be inserted also to provide end to end data integrity and protection, in some examples these protection (or data integrity) fields can be part of the payload, this ensures that standard equipment will not modify these fields and only the end user uses it to validate the payload. These fields can also include other protection information and not just CRC.

Current Network adapters which support RDMA or other protocols which use DDP (direct data placement) implement standard RDMA protocol or proprietary RDMA or DDP with dedicated logic, these implementations targeting specific markets with a selected protocols. A network processor or general purpose CPU can also be used to process these protocols, in this case the implementation can be more generic but reduces the performance, increase the latency, require much more power, and not cost effective.

Converged Network Adapter supports reception and transmission of multiple protocols at the same time, in some cases the protocols are encapsulated using tunneling protocols (for example FCoE, IP over IP, GRE, etc.) these network adapter can also support full implementation or acceleration for RDMA protocols and DDP (direct data placement).

There is provided a method for performing data integrity processing by a configurable data integrity unit that is generic and may be configured to perform data integrity processing of any protocol (including standard protocols and/or proprietary protocols). Due to its configurable nature the data integrity unit may support future protocol, future protocol extensions and future protocol modifications.

The data integrity unit may be configured according to one out of multiple configurations—depending upon the received data to be data integrity processed. Any configuration may determine how the data integrity unit operates.

The configuration may include one or more configuration parameters that can be adjusted to support any protocol and packet format. Non-limiting examples of configuration parameters may include:
a. Offset from start of a packet that marks the start point of data to be data integrity processed.
b. Offset from end of a packet that marks the end point of data to be data integrity processed.
c. Initial values of any data integrity algorithm to be applied during the data integrity processing.
d. One or more masks—that may mask one or more portions of the packet and prevent the one or more portions from being data integrity processed. Alternatively—a mask may define one or more portions to be data integrity processed.
e. Location of one or more data integrity fields that are included in the packet.
f. Data integrity processing type (CRC, CRC type, HASH, HMAC, SHA, MD5 etc.).

According to an embodiment of the invention there is provided a system that includes (a) a configurable parser that comprises one or more configurable parsing engines, wherein the configurable parser is arranged to receive a packet and to extract from the packet headers associated with a set of protocols that comprises at least one protocol; (b) a packet type detection unit that is arranged to determine a type of the packet in response to the set of protocols; and (c) a configurable data integrity unit that comprises a configuration unit and at least one configurable data integrity engine.

The configuration unit may be arranged to configure the at least one configurable data integrity engine according to the set of protocols.

At least one configurable data integrity engine is arranged to perform data integrity processing of the packet to provide at least one data integrity result.

The configurable parser may be configured to determine the packet type of every received packet—based on the parsing result and the combination of all the detected protocols, L2/L3/L4, encapsulation/tunneling protocols, and the configuration unit may configure the configurable data integrity unit according to the type of the packet. The configuration unit can generate different configuration and parameters for each received packet based on the detected packet type.

The data integrity unit may include one or more configurable data integrity engines. In case there are multiple configurable data integrity engines—they may work in parallel to each other, independently from each other, in dependency, in serial, and the like. The configuration unit may configure each of the configurable data integrity engines. Alternatively, more than a single configurable data integrity engine may share a same configuration in at least some points in time.

A packet of a certain type may be associated with a set of protocols and there may be provided one or more configurable data integrity engines for the set of protocol. For example—each protocol of the set of protocols may be associated with a single protocol of the set of protocols. Yet for another example, one or more configurable data integrity engine may be configured to perform data integrity processing of one protocol of the set of protocols and at another point in time be further configured and perform data integrity processing of another protocol of the set of protocols.

Using multiple data integrity engines in parallel may speed up the processing of packets associated with a set of protocols that includes multiple protocols. This enables supporting multiple packet formats with encapsulations and/or multiple protocols that uses different formats and methods of data protection and data integrity check. The multiple engines can be used for both standard and non-standard protocols concurrently.

According to an embodiment of the invention the method may be applied for providing end-to-end data integrity checks. In some cases where the packets are forwarded between multiple network elements (such as switches and routers) some of the fields of the packets are allowed to be modified. These fields (also called variant fields) may not be data integrity processed during an end-to-end data integrity check.

Examples of variant fields may include (a) Time To Live (TTL) field that is modified by routers, and (b) TCP ports which can be modified when packet goes through NAT (network address and port translation).

On the other hand fields which are not allowed to modified (unless they are corrupted) (are also called invariant fields) can be data integrity processed during end-to-end data integrity checks.

According to an embodiment of the invention one of the configuration parameter relates to a mask. The mask that is described later in the specification may be used to mask (or skip) the variant fields and leave the masked invariant fields to be data integrity processed.

According to an embodiment of the invention end-to-end integrity checks can be executed by configuring the data integrity unit to mask variable fields and process invariable fields.

Figure 10:
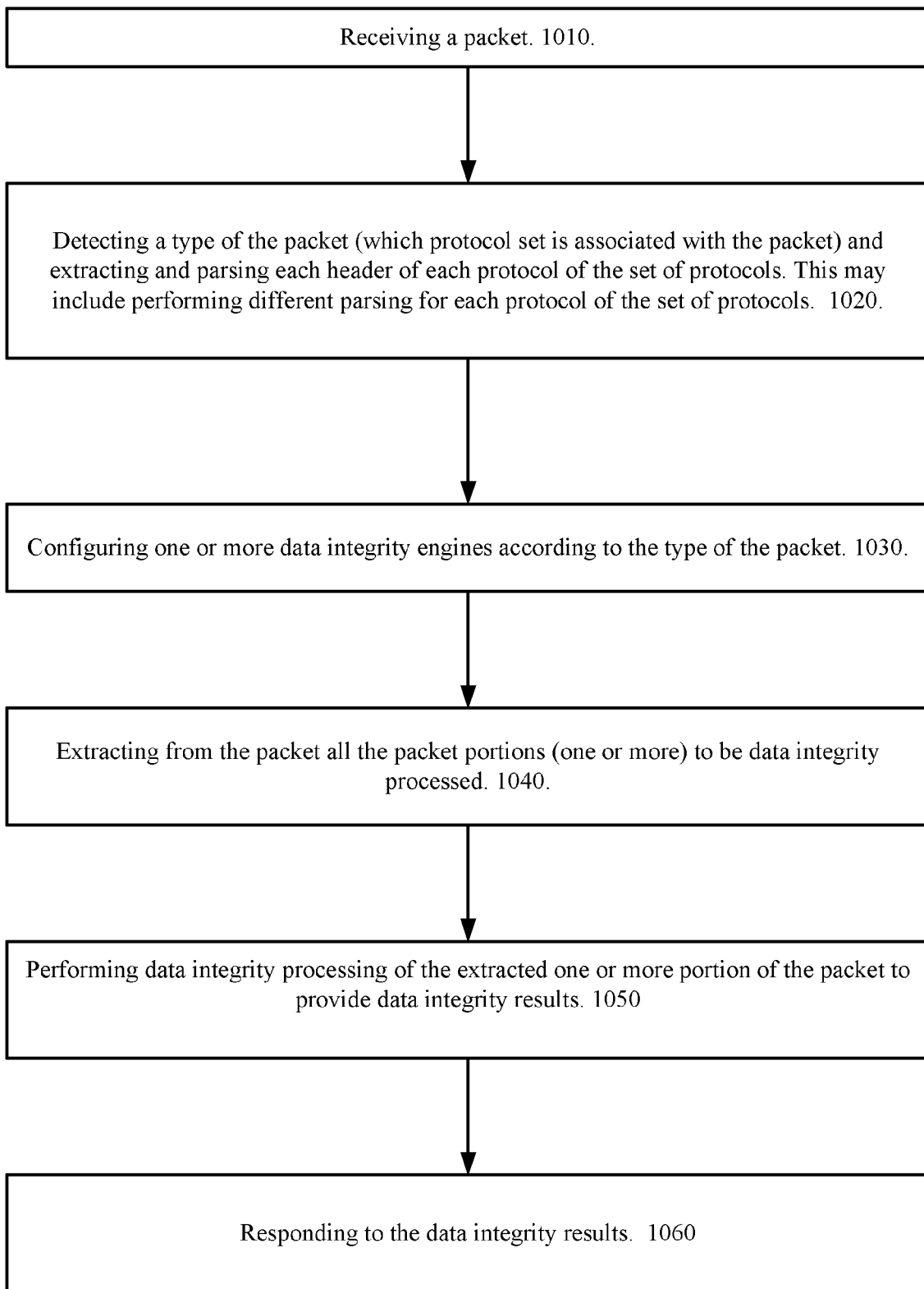
FIG. 10 illustrates a method according to an embodiment of the invention.

FIG. 10 illustrates method 1000 according to an embodiment of the invention. Method 1000 may include the following stages:
a. Receiving a packet. (1010).
b. Detecting a type of the packet (which protocol set is associated with the packet) and extracting and parsing each header of each protocol of the set of protocols. This may include performing different parsing for each protocol of the set of protocols. (1020).
c. Configuring one or more data integrity engines of a data integrity unit according to the type of the packet. (1030).
d. Extracting from the packet all the packet portions (one or more) to be data integrity processed. (1040).
e. Performing data integrity processing of the extracted one or more portion of the packet to provide data integrity results. (1050).
f. Responding to the data integrity results. (1060).

The responding may include, for example:
i. Forwarding the data integrity results to be used by a next processing entity (a processing engine and/or software) that follows the data integrity unit.
ii. For each protocol of the set of protocols, forwarding or trimming the integrity check result related to the protocol to the next processing entity.
iii. Forwarding the integrity check results, together with the data, trimming and use for validation, forward to the software.
iv. Trimming a portion of the packet that was found to be invalid to reduce memory foot-print or to allow the data to be aligned (for example page-aligned in storage applications).

Figure 11:
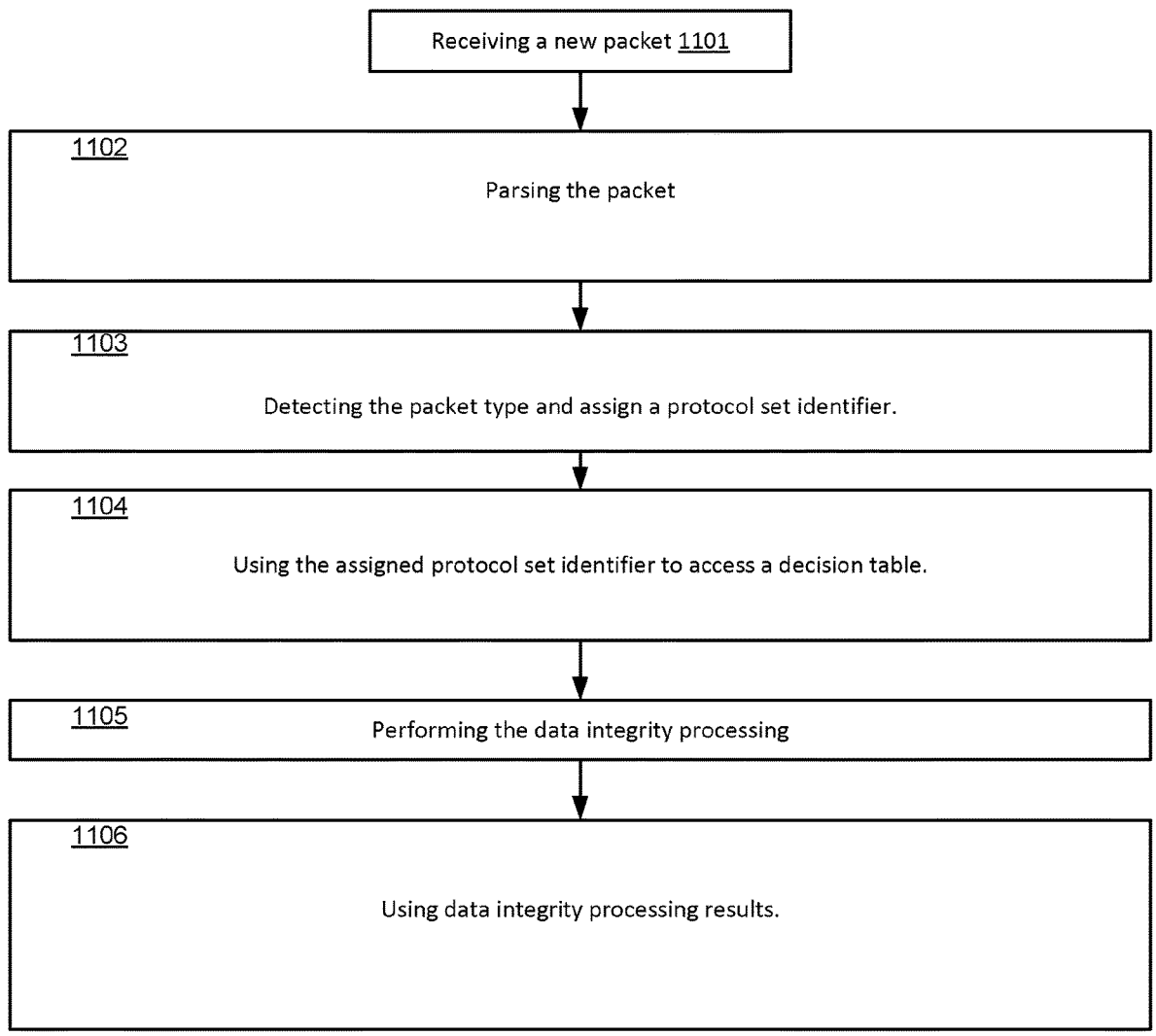
FIG. 11 illustrates a method according to an embodiment of the invention.

FIG. 11 illustrates method 1100 according to another embodiment of the invention.

Method 1100 may include the following stages:
a. Receiving a new packet. (1101).
b. Parsing the packet. (1102). This may include, for example—detecting L2/L3/L4 protocols (outer header), detecting if the packet is encapsulated/Tunneled and if yes detecting L2/L3/L4 protocols of the inner header. The parsing may also include extracting the offsets of all the headers are also extracted.
c. Detecting the packet type and assign a protocol set identifier (1103). The protocol set includes protocols associated with the type of the packet. The assigning may be based on combination of all the detected headers/protocols of the packet.
d. Using the assigned protocol set identifier to access a configuration unit. (1104). The configuration unit includes configuration for one or more configurable data integrity engines for this specific set of protocols. The configuration unit can include different configurations for multiple data integrity engines.
e. Performing (1105) the data integrity processing (CRC, HASH, etc.). This may involve using the configurations received form the configuration unit.
f. Using (1106) data integrity results. This may include one or more or neither one of (a) Inserting calculated CRC in the configurable offset in the packet; (b) Removing a CRC field from the configurable offset in the packet; (c) Comparing the calculated CRC with the received CRC from a configurable offset in the packet; and (d) forwarding the CRC and check result for processing of the next engine or the software.

Figure 12:
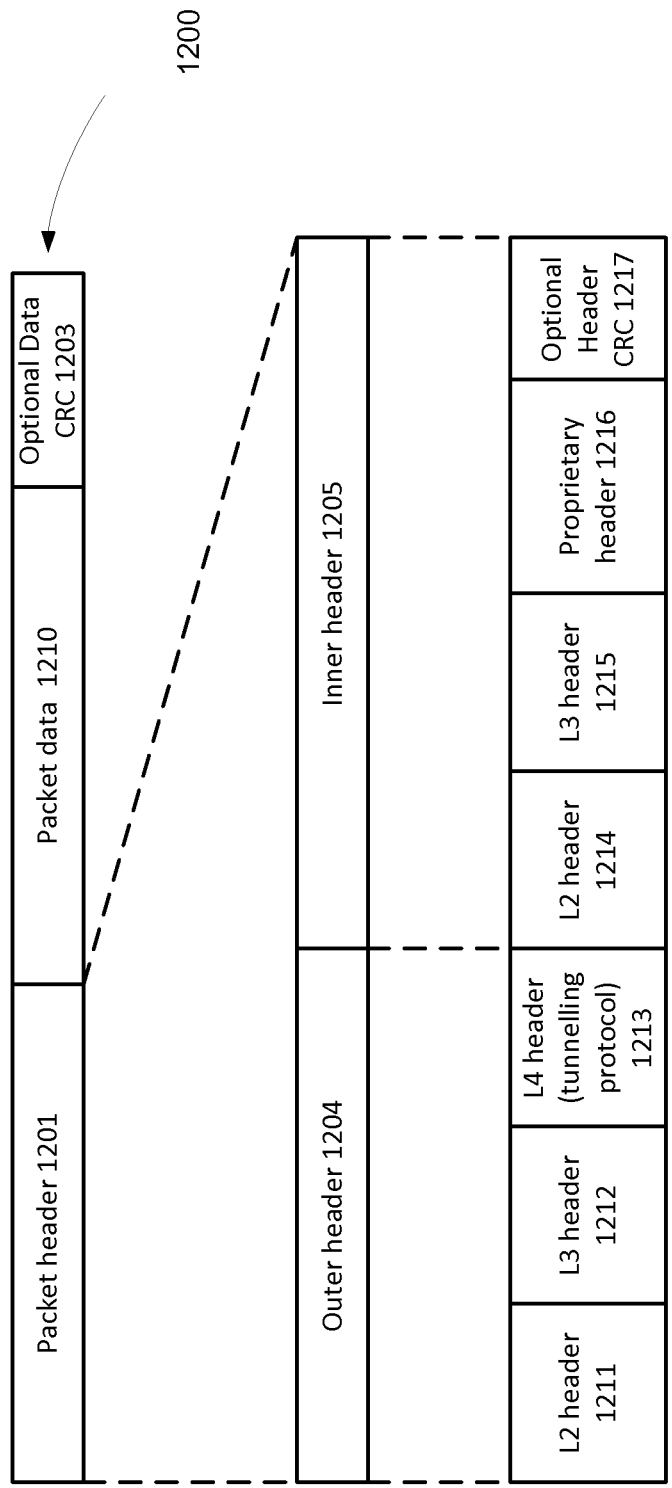
FIG. 12 illustrates a packet that includes an outer header and an inner header.

FIG. 12 illustrates a packet 1200 that includes a packet header 1201, packet data 1210 and optional data or CRC field 1203. The packet header 1201 is illustrates as including an outer header 1204 and an inner header 1205. The outer header 1204 is illustrated as including a L2 header 1211, L3 header 1212, L4 header 1213 of a tunneling protocol. The inner header 1205 is illustrated as including a L2 header 1214, L3 header 1215, a proprietary header 1216 and an inner header CRC (denoted "optional header CRC) 1217.

Figure 13:
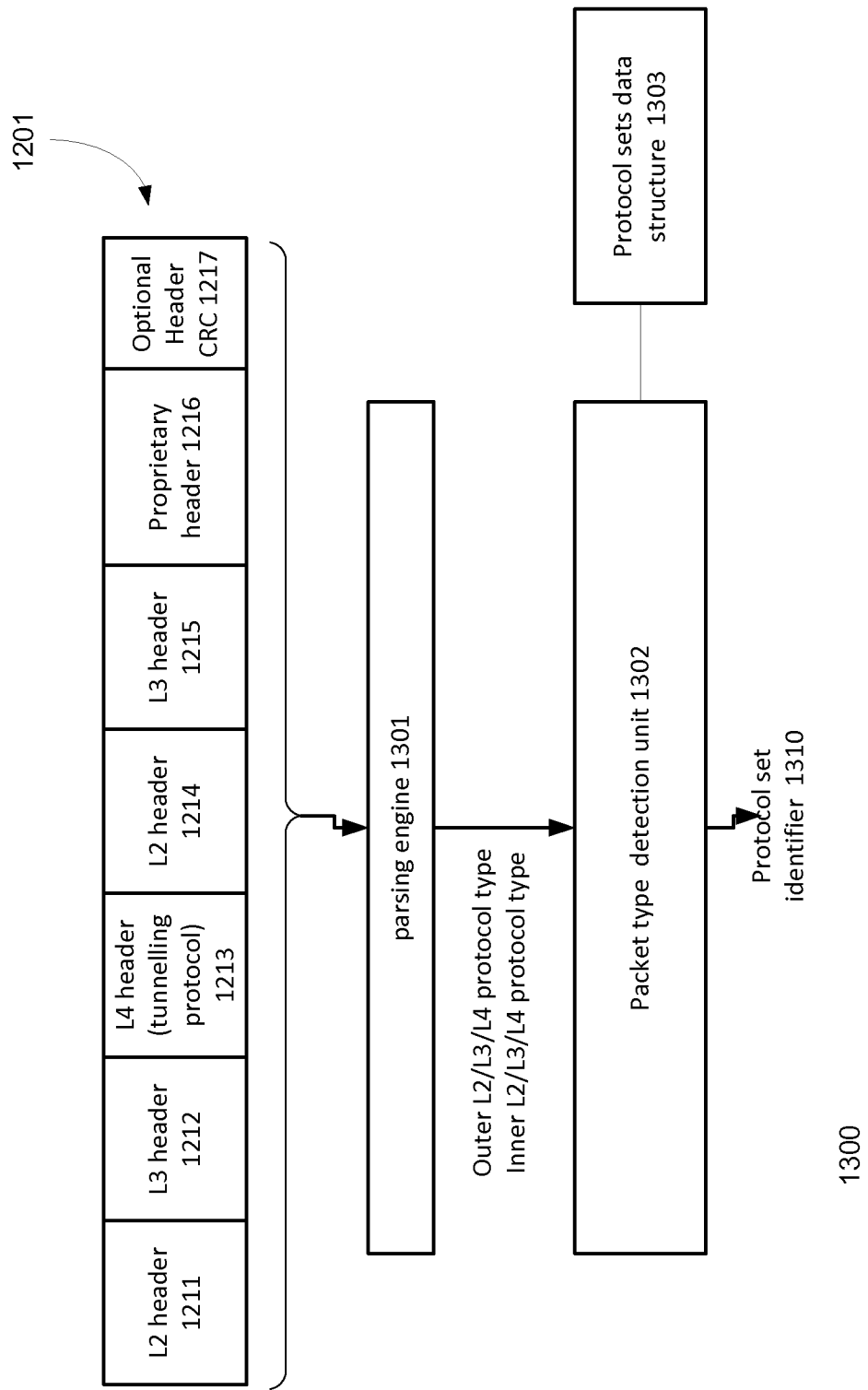
FIG. 13 illustrates a packet that includes an outer header and an inner header and a parsing and packet type detection process according to an embodiment of the invention.

FIG. 13 illustrates packet header 1201 and a parsing and packet type detection process according to an embodiment of the invention.

Figure 3:
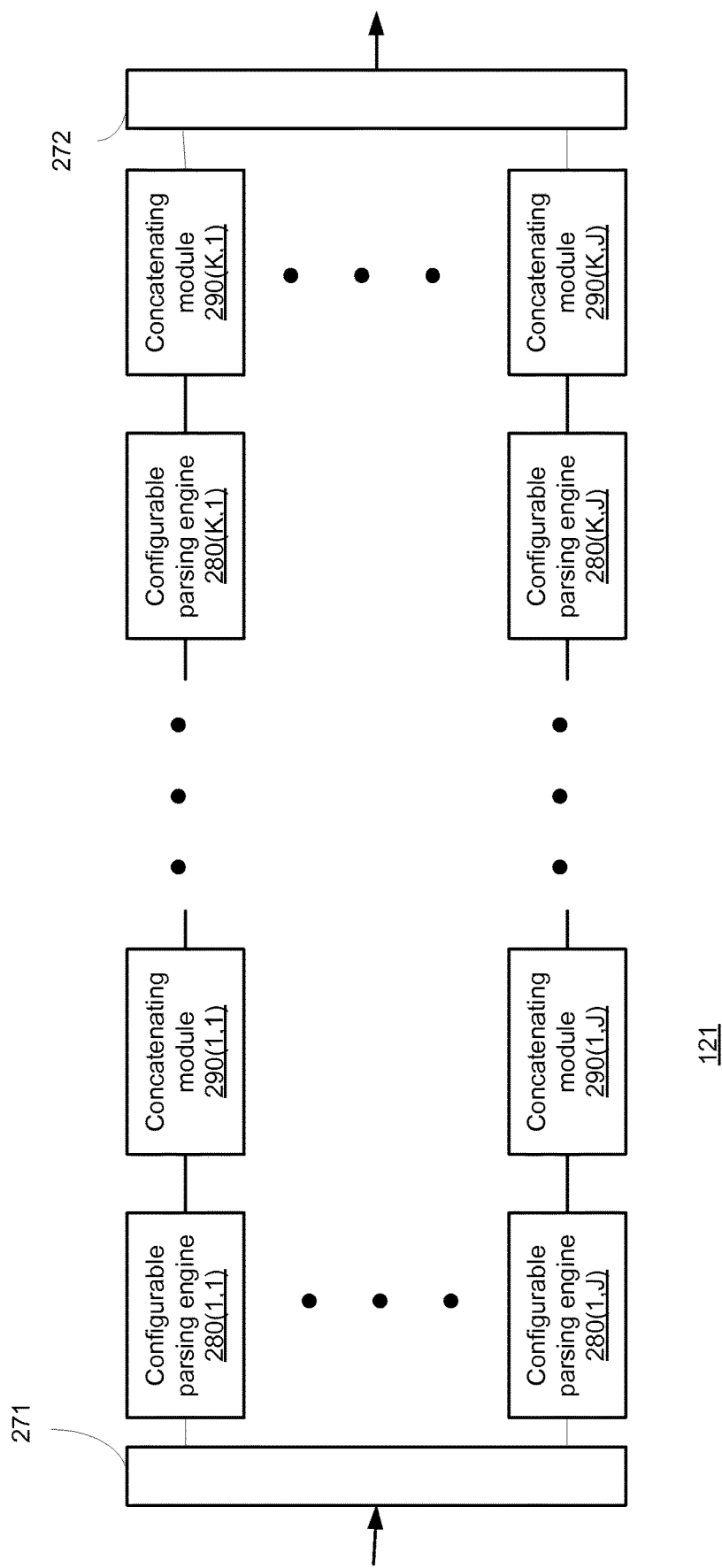
FIG. 3 illustrates an Ethernet Parsing Engine according to an embodiment of the invention.
Figure 4:
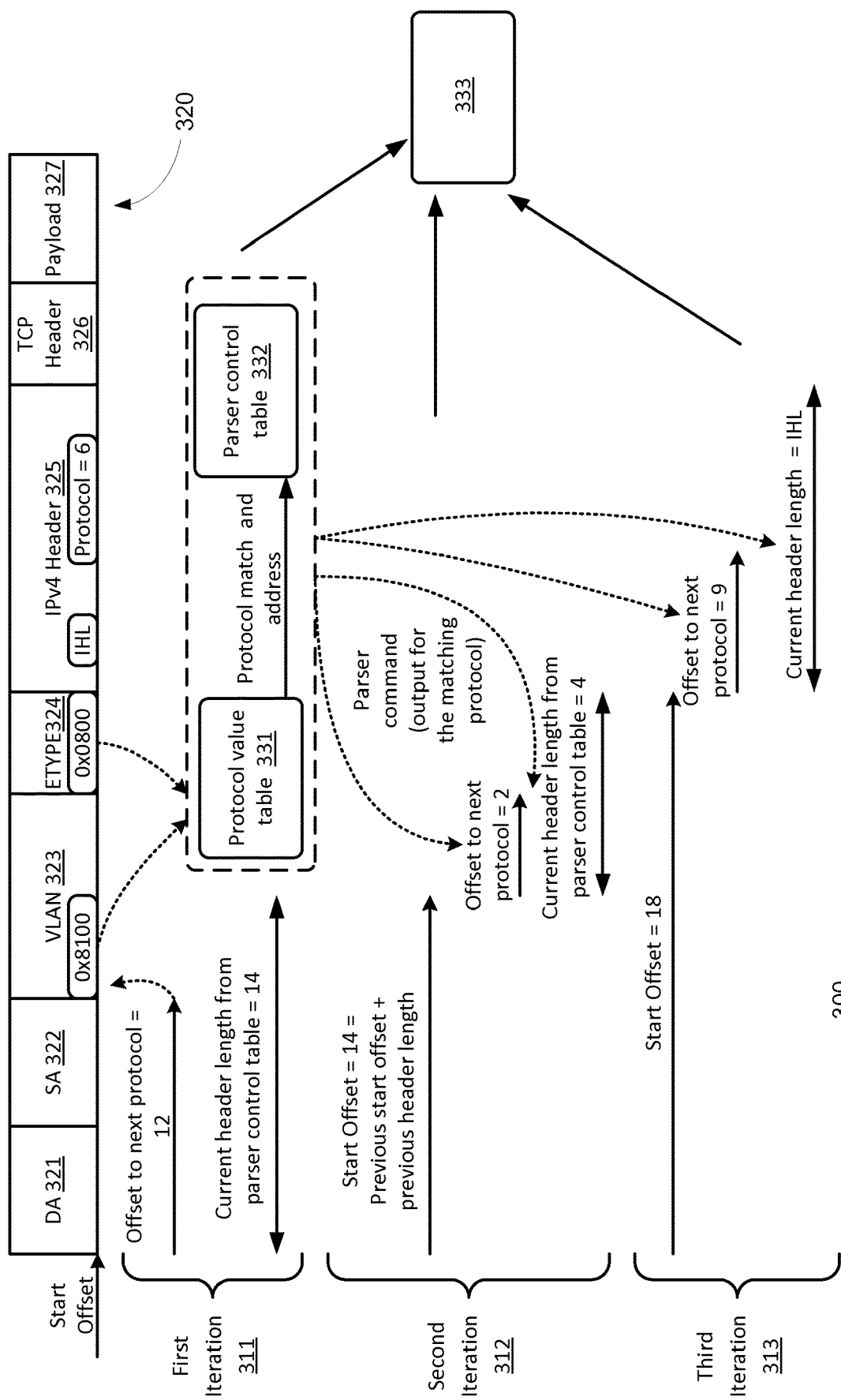
FIG. 4 provides an example of a processing operation of an information unit that is a TCP/IP frame that is processed by multiple configurable parsing engines.

The packet that includes the packet header 1210 is fed to the parsing engine 1301 that parses the packet to detect its headers. An example of such a parser is illustrated in FIGS. 3 and 4.

The parsing engine (1301) is a configurable parser and may be used to detect all the packet headers, it is used to extract the L2/L3/L4 protocols (standard and non-standard protocol detection), in this process the RDMA can also be identified in one of the network headers.

When tunneling or any other encapsulation method is detected, the inner headers are also parsed and the inner protocols are also detected.

The output of the parser is fed to a packet type detection unit 1302 that may be (or may include) a CAM memory. The packet type detection unit 1302 determines the type of the packet based upon the set of protocols associated with the packet—each protocol of the set has a header that is identified by the parsing engine 1301.

This may involve accessing a protocol sets data structure 1303 and comparing the protocols associated with the packet with predetermined sets of protocols.

The packet type detection unit 1302 outputs a protocol set identifier (also referred to a packet type identifier) that is indicative of the type of the packet—of the set of protocols associated with the packet.

Figure 14:
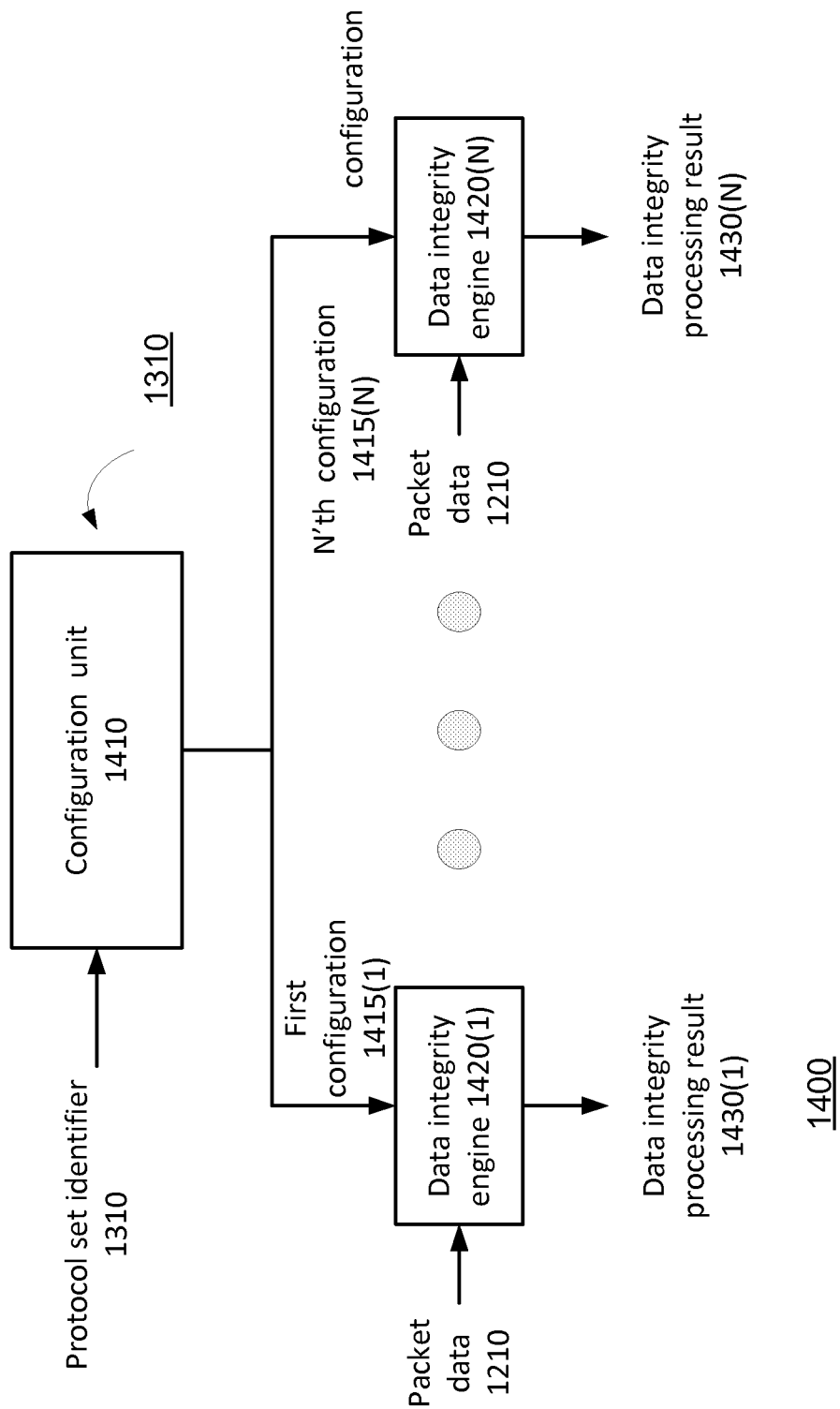
FIG. 14 illustrates a data integrity unit that includes a configuration unit and multiple data integrity engines according to an embodiment of the invention.

FIG. 14 illustrates a data integrity unit 1400 that includes a configuration unit 1410 and multiple data integrity engines 1420(1)-1420(N) according to an embodiment of the invention. N is a positive integer.

The data integrity unit 1400 may belong to a controller such as Ethernet controller 120 of FIG. 1. It may belong, for example, to Ethernet Checksum Engine (ECSE) 122 and/or to Ethernet forwarding engine (EFE) of FIG. 1.

The protocol set identifier 1310 is fed to the configuration unit 1410 and in turn the configuration unit send configurations (1415(1)-1415(N)) to the N data integrity engines 1420(1)-1420(N)—thereby configuring each of the data integrity engines to perform data integrity processing on up to N portions of the packet—according to up to N protocols associated with the packet.

The N data integrity engines 1420(1)-1420(N) may output up to N data integrity results 1430(1)-1430(N). Each result may be, for example, a calculated CRC value.

New configurations can be provided to the N data integrity engines 1420(1)-1420(N)—each packet.

The N data integrity engines 1420(1)-1420(N) can be used simultaneously with different configurations on the same packet.

Each of the configurations (1415(1)-1415(N)) may include one or more data integrity parameters:
a. Header offset
b. offset
c. Function select (for example CRC32/CRC32c/HMAC/SHA/etc.)
d. init_value
e. trail_size
f. header_size+sign
g. data_byte_swap
h. data_bit_swap
I. Result byte_swap
J. Result bit_swap
k. Result bit_comp (NOT)
l. mask+polarity FIG. 15 illustrates a packet 1200 and a data integrity engine according to an embodiment of the invention.

Figure 15:
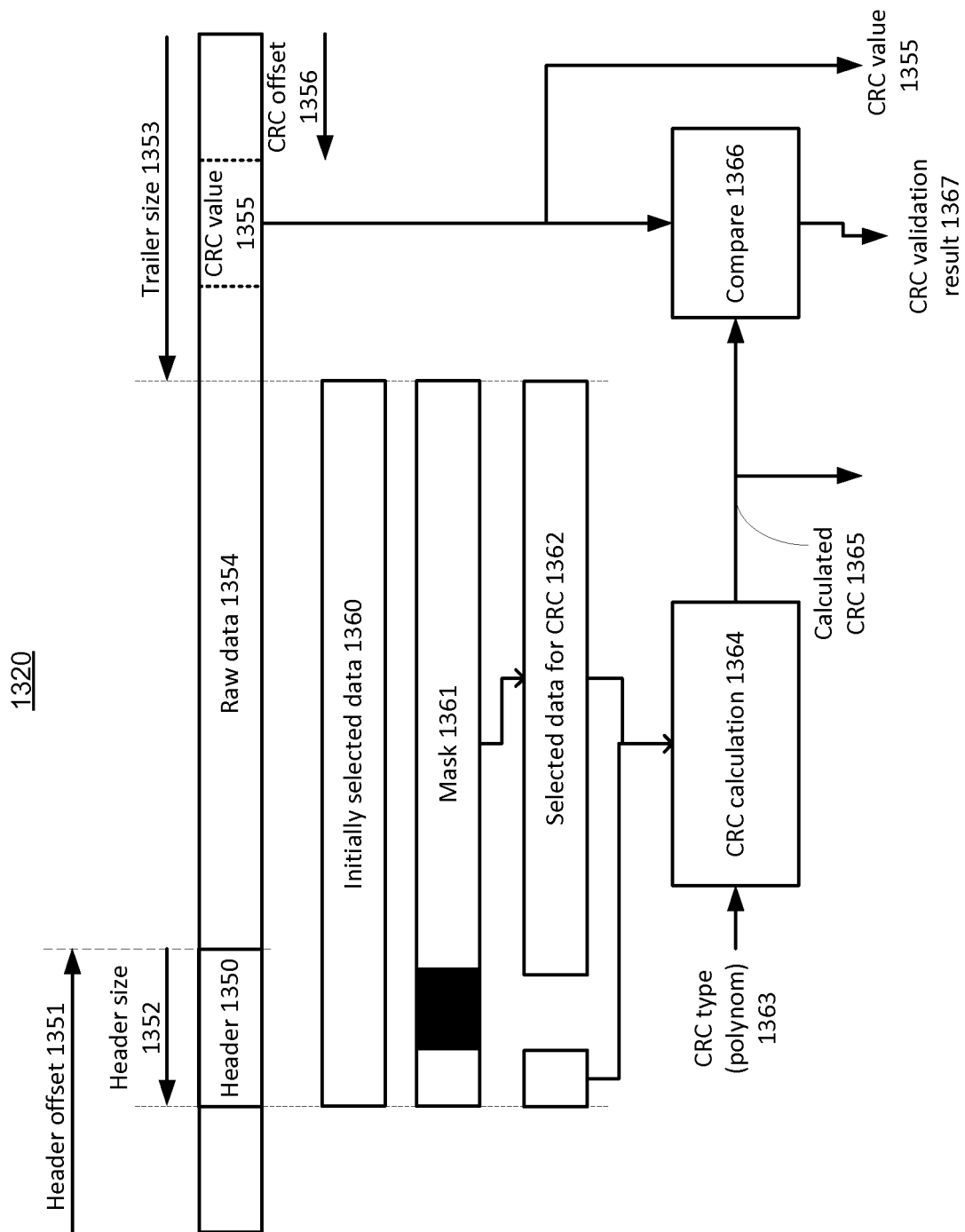
FIG. 15 illustrates a packet and a data integrity process according to an embodiment of the invention.

FIG. 15 illustrates a packet that includes packet data (raw data) 1354, a CRC value 1355 and a header 1350. The location of the header is indicated by header offset 1351 (indicative of the offset from the end of the header to the start of the packet) and a header size field 1352. The packet includes a CRC value 1355. The location of the CRC value 1355 is indicated by CRC offset 1356 (indicative of the offset from the end of the CRC value to the end of the packet).

The raw data 1354 includes initially selected data 1360 that is located between a start point pointed by the header offset 1353 and between an end point pointed by trailer size 1353.

The initially selected data 1360 is masked (black box indicates data that is masked) by mask 1361 to provide selected data for CRC calculation 1362 that is fed (with CRC type polynomial 1363 to CRC calculator 1364. The CRC calculator 1364 outputs a calculated CRC 1365 that may be compared (by compare unit 1366) to the CRC value 1355 included in the packet to provide CRC validation result 1367.

The calculated CRC and/or the CRC validation result 1367 may be a data integrity result.

Items 1351, 1352, 1353, 1356, 1361 and 1363 may be a part of the configuration that is sent from the configuration unit 1410.

Header Offset and Masking

In some protocols, the offset where to start the data integrity calculation is dynamic and depends on some of the header fields (for example when one or more of the detected headers has variable header size).

In these cases the offset where to start the calculation can be calculated based on the parsing parameters (such as L3/L4 offset, L3/L4 header size, etc.) and additional values that can be protocol specific and can be configured in the configuration unit.

The mask 1361 may be used to skip (or mask with configurable values) the variant fields while keeping the invariant fields in the calculations.

A variable offset calculation may use a generic ALU engine which can be configured with different commands for each protocol.

Figure 16:
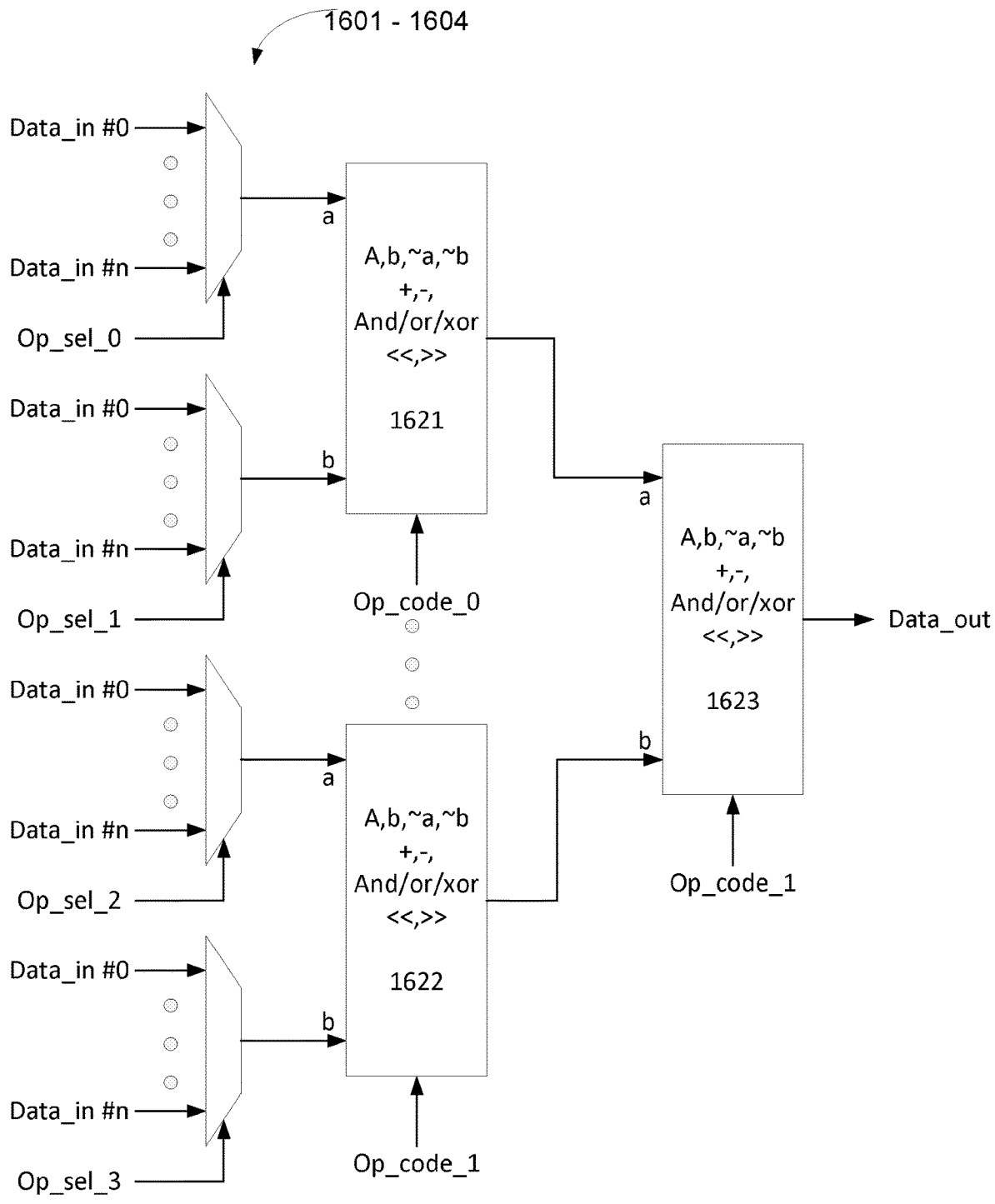
FIG. 16 illustrates an offset calculator according to an embodiment of the invention.

FIG. 16 describes a generic ALU which can be used to calculate variable offsets, according to an embodiment of the invention.

The generic ALU may include multiple data inputs that are used as the command arguments, these data inputs can include some of the parsing results (L2/3/4 headers offset, length) and can include additional values which are output of the configuration unit and can vary between different packets with different protocol types.

The ALU also has command (OpCode) inputs which determines which calculation to perform on the data inputs, these commands/OpCodes can be output of the configuration unit and determine different calculation for every packet based on the packet type and the detected protocols.

Either one of method 1000 and 1100 may support at least one of the following:
a. Support data integrity processing of any data integrity function in any protocol (such as multiple CRC types, HASH, etc.).
b. Support simultaneous data integrity processing related to multiple protocols related to the same packet.
c. Support for data integrity processing of proprietary protocols and proprietary packet formats.
d. Support end-to-end data protection.
e. Supports differentiating between for variant and invariant fields.

Any one of method 1000 and 1100 may be implemented in a hardware data path without any CPU intervention and without duplicated hardware as the same hardware engine supports any protocol and headers.

The Parser

There may be provided a system that may include a parser that is configured to handle the dynamic network environment, that is flexible to support multi protocols simultaneously, that is configurable to support any known, proprietary and future protocols. The parser can support multi-layer encapsulation without increasing the complexity of the implementation. The parser may be modular and may support any line rate (from 1 Gbps to hundreds of Gbps), can provide efficient software offload, have a small silicon area and consume low energy.

The parser may include multiple configurable parser engines and concatenating modules. The parser may be configured to perform deeper packet parsing, may increase the number of supported protocols and may keep line rate performance. The parser may include a distribution module for performing load balancing between the configurable parsing engines and enable scaling of the supported data rate.

Each configurable parsing engine may be configurable and enable multi-protocol support. Each configurable parsing engine may be fed with an offset (from initial phase or previous parsing engine), may check a selected portion of an information unit (a protocol payload) in a configurable offset, preform any arithmetic logic on the protocol payload to determine next protocol, checks for header length in a configurable offset, perform any processing (such as arithmetic logic) on the header length to determine the next offset, update a result vector with different header fields, can select which field (configurable offset and length) to store in a result vector to be used by next engine or another module, update control information and statistics to be used by the next engine or another module.

The result vector can hold information such as addresses, priority, etc.

The results vector can hold command for the next parser or a next module (for example a forwarding engine).

The parser may be included in a communication controller such as an Ethernet Controller that may be a high-performance unit responsible for connecting host processor and its memory with the Ethernet world.

FIG. 1 illustrates a system 100 that includes an Ethernet controller 120 according to an embodiment of the invention.

The system 100 may include four major blocks: (a) An Ethernet MAC 110, with integrated PCS and PMA layer in most cases (Ethernet MAC and PCS); (b) An Ethernet controller 120 that processes Ethernet packets, and offloads the host to boost system performance; (c) A bus-master scatter-gather DMAs 130(1)-130(4) based on the common Universal DMA (UDMA) architecture, The UDMA performs rate shaping and scheduling functions as well, and (d) A PCI Integrated End Point (IEP) unit interface 140 to the internal I/O fabric.

FIG. 1 also shows XMII 101 and SERDES 102 modules as being coupled to Ethernet MAC 110.

The IEP unit interface 140 is shown as including a power management module 141, an error management module 142, a bus master arbiter towards 1/0 fabric module 143, a PCI configuration header module 144 and a configuration but module 145. The configuration bus module 145 is connected to a configuration bus 150 that is connected to the DMAs 103(1)-130(4) and to the Ethernet MAC 110.

Figure 2A:
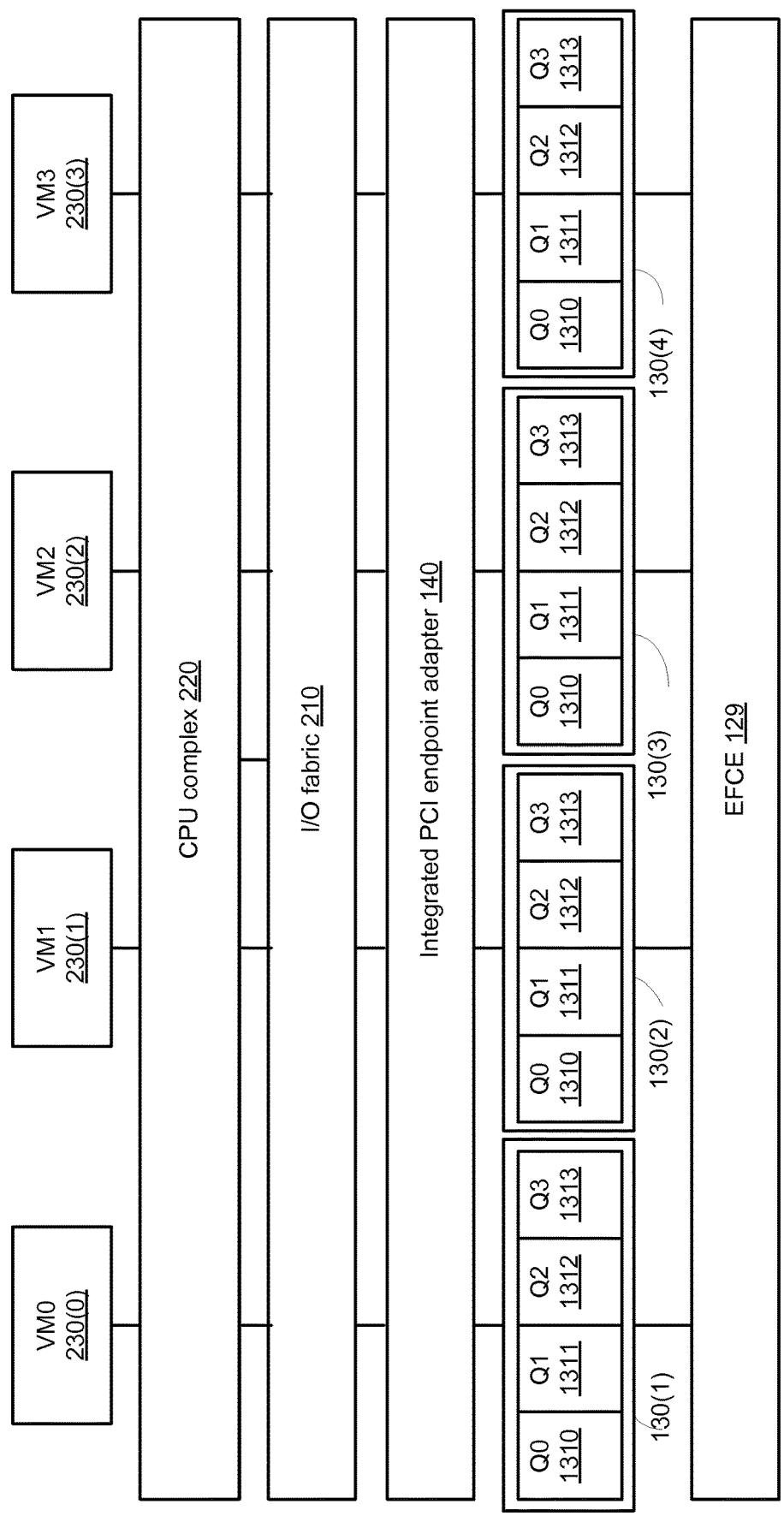
FIGS. 2A and 2B illustrate various Direct Memory Access Controllers (DMAs) of the system of FIG. 1 and their environments according to various embodiments of the invention.

FIG. 2A illustrates part of the connectivity, according to an embodiment of the invention, between the DMAs 130(1)-130(4) and the integrated PCI endpoint adaptor 140 to I/O fabric 210 and to a CPU complex 220 that hosts multiple virtual machines VM0-VM3 230(0)-230(3).

Figure 2B:
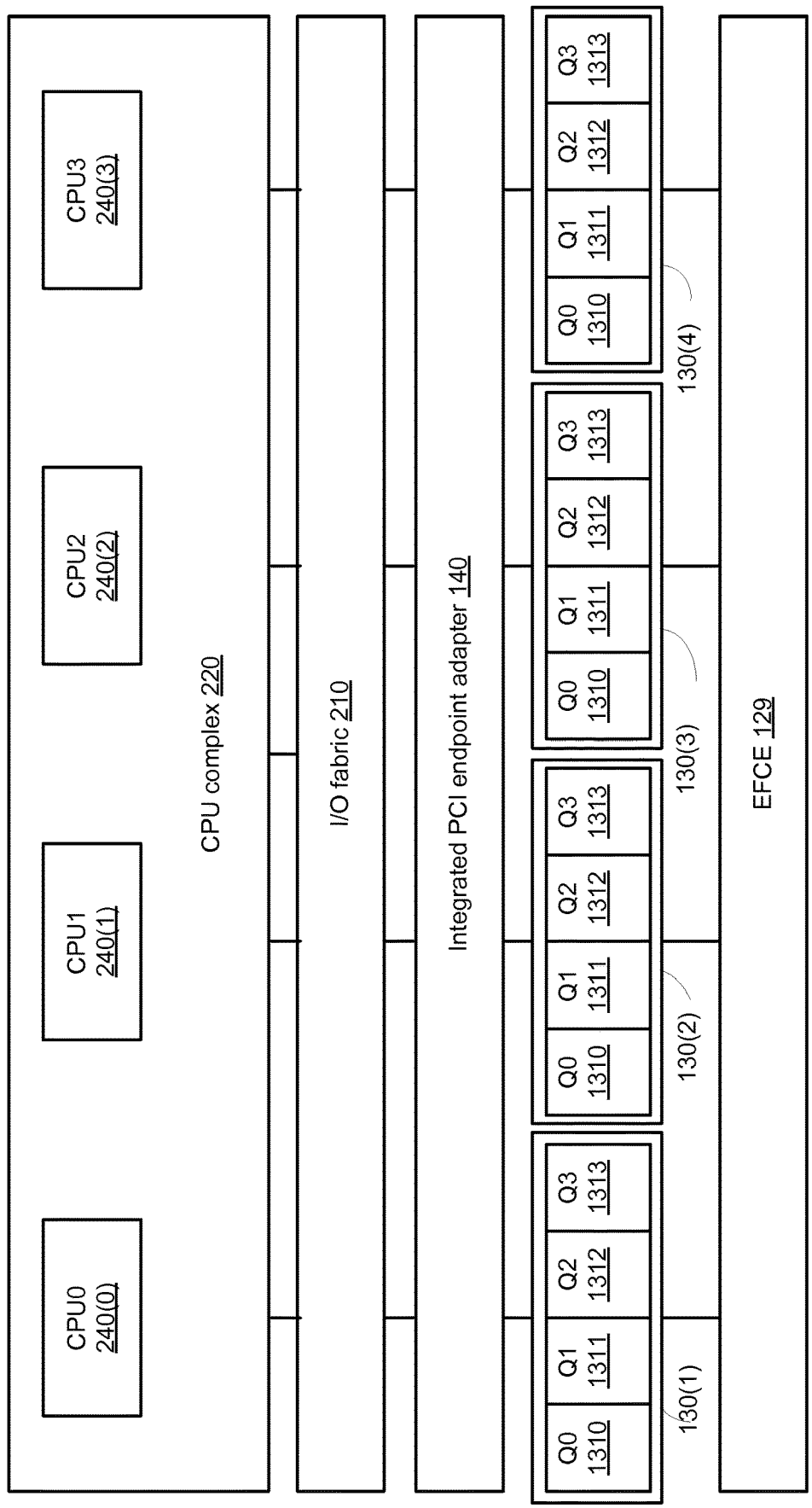

FIG. 2B illustrates part of the connectivity, according to an embodiment of the invention, between the DMAs 130(1)-130(4) and the integrated PCI endpoint adaptor 140 to I/O fabric 210 and to a CPU complex 220 that includes multiple CPUs 240(0)-240(3).

In FIGS. 2A-2B each DMA is illustrates as including four queues 1310-1313, 1320-1323, 1330-1333 and 1340-1343 respectively. A selection of a destination (CPU or virtual machine) may select which queue will be used to store information units destined to the destination.

Referring back to FIG. 1, the Ethernet controller performs various packet-processing functions to offload the host processor, improve performance, and enforce security.

The HOST processor can be on chip CPU (CPU complex, 220) or can be external CPU which is connected to the chip through (for example) PCIe interface, so I think we can change 'host processor' to 'CPU' and add another sentence that says that the CPU can be on chip CPU or external CPU.

There are two versions of the Ethernet controllers: Standard Ethernet controller and Advanced Ethernet controller.

Standard Ethernet Controller

The Standard Ethernet controller provides common Ethernet functionality in common usage cases, specifically for home, consumer, small to medium business, and development environments.

It supports the functionality described in the following subsections, at all speeds.

Ethernet Checksum Engine (ECSE) 122

The Ethernet Checksum Engine (ECSE) offloads the host by calculating the IPv4 header checksum and the TCP/UDP checksum.

In the TX direction, The IPv4 and TCP/UDP checksum is inserted to the transmitted packet in a pre-configured offsets based on the parsing information.

Note that when the software sends consecutive packets with the same characteristics, the offsets and control information from the first packet can be stored and used for the next packets.

In the RX direction, the parsing engine provides all the information required for checksum calculation (detected protocols and offsets), the checksum engine calculate the IPv4 and TCP/UDP checksum and compare it to the received value, the result is forwarded to the software in the completion descriptor.

When tunneling is used, the checksum engine can perform the checksum offload for outer packet or the inner packet.

Ethernet Forwarding Engine (EFE) 123

The Ethernet forwarding engine includes a filtering engine and a flow steering engine.

The Ethernet Filtering Engine performs basic MAC Address and VLAN filtering, permitting only desired traffic to hit host memory. It is responsible for MAC/VLAN spoofing prevention.

Ethernet Flow steering Engine (EFSE)—For packets received from the Physical Ethernet MAC in a virtualized environment, the EFSE decides to which virtual machine/OS this packet should go, including multicasting the packet to multiple virtual machines, or sending it to the hypervisor only. In AMP environment the flow steering engine decides to which CPU each packet should go.

The flow steering engine can also perform load balancing to assist performance of a single operation system or single virtual machine that runs on multiple processors (or threads). The ELBE distributes incoming packets from the physical Ethernet ports to the different DMAs, based on pre-defined criteria or based on a load-balancing hash. This distributes traffic loads to multiple processors based on hash or desired affinity.

The EFSE also classifies the packets to traffic classes and Quality of Service (QoS), enabling appropriate QoS treatment.

The output of the parsing engine is used to determine the packet priority, both L2 (VLAN priority) and L3 (IP DSCP/TOS) can be used to determine the packet priority and the target queue.

The output of the forwarding engine is the target DMA and target queue.

Ethernet Modification Engine (EME) 124 may include an Ethernet VLAN Engine (EVE) 125.

The EVE 125 performs VLAN header modification, generation, and removal.

The VLAN modification command is forwarded to the modification engine in the metadata, the same command can be used to consecutive packets transmitted from the same queue, this feature enables the software to determine one VLAN modification configuration for a specific flow, send it once through a metadata descriptor and the hardware will implement the same command for all consecutive packets without any software load.

Ethernet Switching Engine (ESE) 126

ESE functionality is required only in a virtualized environment or in an asymmetric multi-processor (AMP) environment. The purpose of the ESE is to provide packet switching between the various Virtual Machines or Operating systems running on the same chip, and the Physical Ethernet MAC.

For packets received from the Physical Ethernet MAC, the ESE decides to which virtual machine/OS this packet should go, including multicasting the packet to multiple virtual machines, or sending it to the hypervisor only.

For an outbound packet, i.e., a packet being transmitted by a given virtual machine or operating system, the ESE decides whether to forward the packet to the physical Ethernet MAC, to another Virtual Machine, or to multicast it to several or all of them.

The ESE and EFSE functionalities are different and complementary: ESE distributes to different operating systems or virtual machines, while EFSE distributes traffic to multiple processors running the same operating system or virtual machine.

Ethernet Inline Cryptography Processor (EICE) 127

The Ethernet Inline Cryptography Processor (EICE) performs Ethernet traffic encryption and decryption, to ensure confidentiality and/or authenticity of the packets. It supports both 802.1AE as well as CAPWAP crypto frameworks.

Traditionally this function was not performed or was performed by the host processor or a co-processor inside the device, which is not optimal from the performance aspect, due to software involvement, as well as multiple memory copies, and the fact that it wastes power.

The inline cryptographic implementation provides the ideal performance and power saving.

Ethernet Segmentation Engine (ESGE) 128

The Ethernet controller performs packet segmentation to offload the software driver. The segmentation process is configurable; the offsets of the L2 and L3 headers and the protocol information are forwarded through the metadata.

The software driver may be running on the CPU, in FIG. 2 it can be the CPU complex (220) or the VM—virtual machines (230) which are running on the CPUs and also has their own software drivers.

The Segmentation engine stores the original packet header, it is used to build new header with updated fields for each transmitted packet, the engine builds new packet by combining the new generated header and the transmitted data based on the selected Max Segment Size MSS.

The protocols indication inside the descriptor (protocol index) indicates the L3/4 protocol of the packet and determines the type of segmentation.

The Segmentation engine may perform packet segmentation to offload software when transmitting long packets or short packets.

The segmentation engine stores the original header and generates new header for each transmitted packet, the original packet data is segmented to multiple packets based on the configured Maximum Segment Size (MSS). The new headers and segmented data are packetized to generate new packets for transmission.

The Segmented packets may go through the same data path and engines used for standard packets (e.g. checksum, modification etc.).

The segmentation engine is (a) programmable and that will handle the dynamic network environment, (b) flexible to support multi protocols simultaneously, (c) configurable to support any known, proprietary and future protocols, (d) capable of supporting multi-layer encapsulation without increasing the complexity of the implementation, (e) provides efficient software offload, requires small silicon area and has a low power consumption. This achieved by using configurable opcodes which can add/remove/replace/increment the data of the packet header with configurable offsets. So based on the packet information and the L2/3/4 protocols, a different sets of commands is selected to modify the packet header and perform the segmentation.

Figure 6:
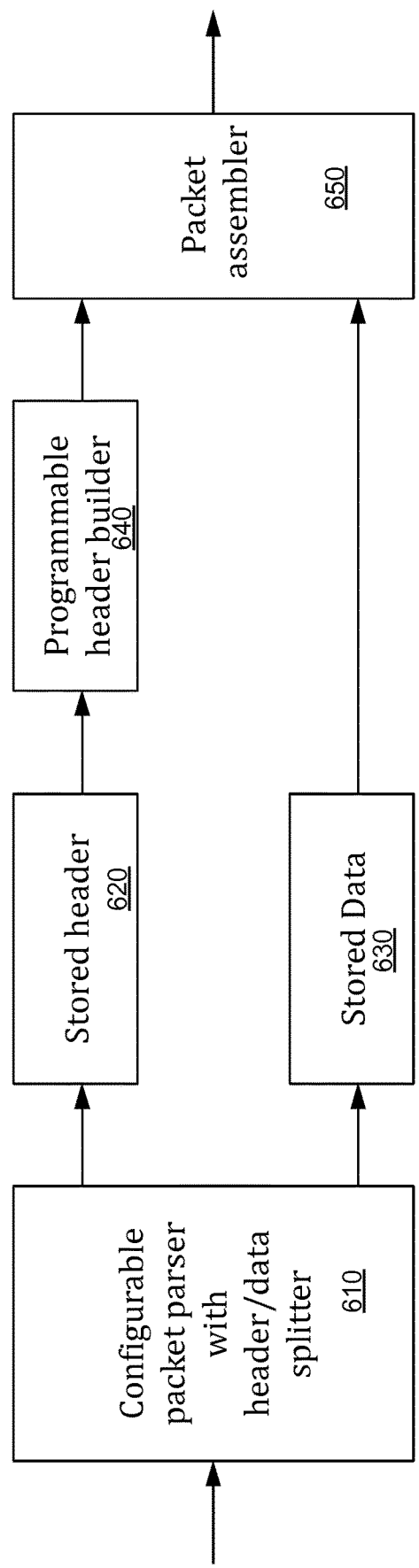
FIG. 6 illustrates a Ethernet Segmentation Engine according to an embodiment of the invention.

FIG. 6 illustrates ESGE 129 according to an embodiment of the invention. It includes (A) a configurable splitter engine 610 that separates the header form the data (this configurable splitting engine can be included in EPE 121 ore receiving information about the locations of headers from EPE 121), (b) a programmable header builder 640 that builds new headers for the segmented packet, (c) memory modules 620 and 630 for storing headers and data respectively, and (d) generic packet assembler 650 that combines the new header and data into a new valid packet.

The programmable header builder 640 may perform a set of generic operations to support any protocol. It detects the packet protocol and split the header information and the payload information. It may receive or generate configurable information per protocol to support for multiple protocol with different offsets, lengths and alignments simultaneously.

The programmable header builder 640 may take a generic header (with any format, offset and length) and builds a new header using a set of configurable rules. The configurable rules are set of commands that can be used to generate new fields and insert them into the packet header, replace existing fields and delete existing fields.

Each command may support configurable offset and length. Each command can be configured to use existing packet data, new packet data, counters, and stored register information.

The set of commands includes both arithmetic and logic commands.

Any header can be build using multiple sets of commands.

Using different configuration of the command sets and their variables, any protocol can be supported and any header can be build.

This enable supports for:
a. Multiple protocols simultaneously on the same system.
b. Standard and proprietary protocols.
c. Protocol encapsulation.
d. Support for future protocols.

The packet assembler 650 may be configured to read the new header and remaining data to generate new valid packet.

Figure 7:
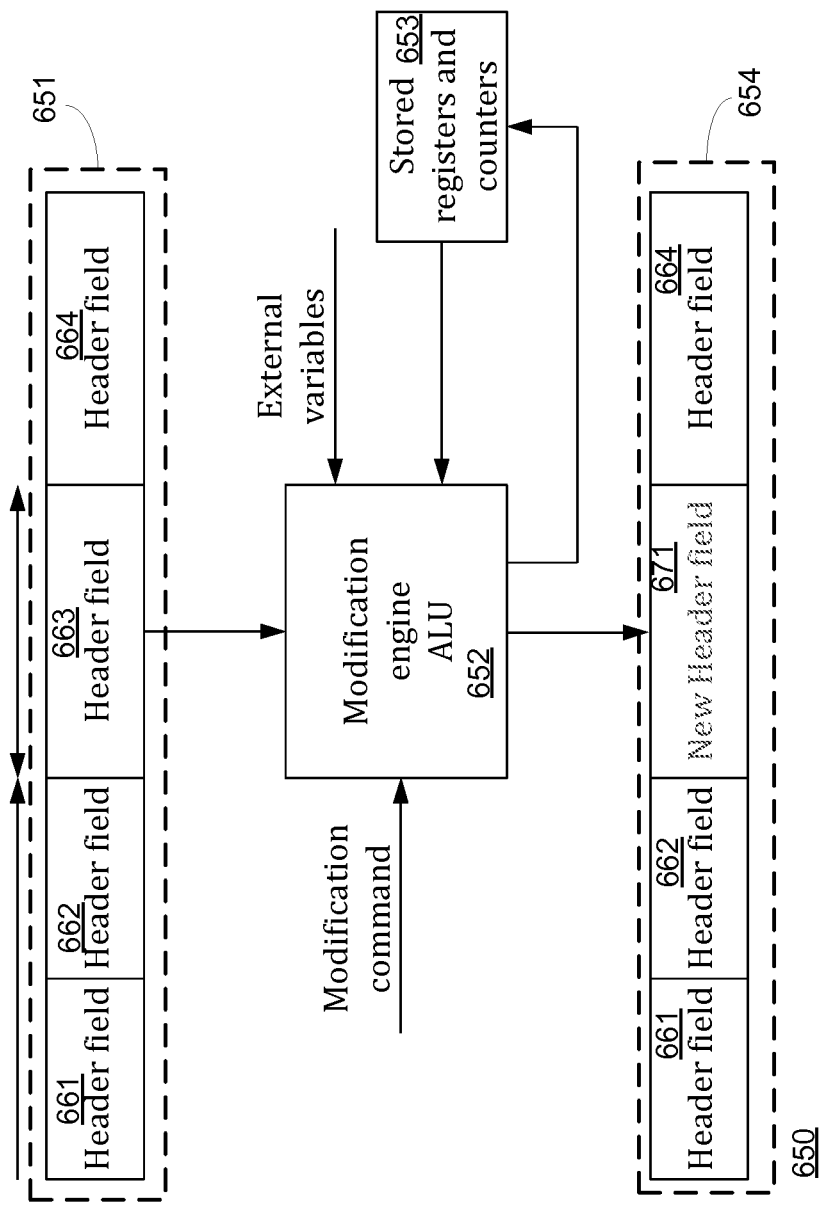
FIG. 7 illustrates programmable header builder according to an embodiment of the invention.

FIG. 7 illustrates programmable header builder 640 according to an embodiment of the invention.

Programmable header builder 640 includes: (a) buffer 651 for storing the current headers of an information unit (such as a sequence of headers 661, 662, 663 and 664), (b) buffer 654 for storing the new headers of the information unit (sequence of headers 661, 662, 671 and 664—as header 671 replaced header 663, (c) modification engine ALU 652 and (d) stored registers and counters 653.

FIG. 8 illustrates various examples of frames that were modified by the programmable header builder 640.

Ethernet Flow Control Engine (EFCE) 129

Ethernet defined flow control to support drop-less links. A later standard for supporting Data Center Ethernet (DCE) added support for priority-based flow control (PFC) To support drop-less Ethernet on certain traffic classes only, and enable native FC-o-Ethernet, RDMA-over-Ethernet (RoCE) etc., the Ethernet standards committee added support for priority-flow control, enabling flow control on selected traffic classes, while allowing normal behavior without flow control on traditional Ethernet traffic.

Priority flow control is supported in advanced mode.

Received PFC packet stops transmission for specific queues, the mapping between the priority in the PFC packet and the DMA queues is configurable.

The flow control engine works in both Tx and Rx directions and coordinates between queue status and queue pause in the UDMA, and generation and reception of flow control packets in the Ethernet MAC.

The Ethernet Flow Steering engine selects the target UDMA and target queue to which to forward the received Ethernet packet.

The Target UDMA can be connected to different host or different virtual machines.

The Flow Steering engine uses the output from the parsing engine for the forwarding decisions. It uses information for both the outer and inner packet when tunneling is detected.

Figure 9:
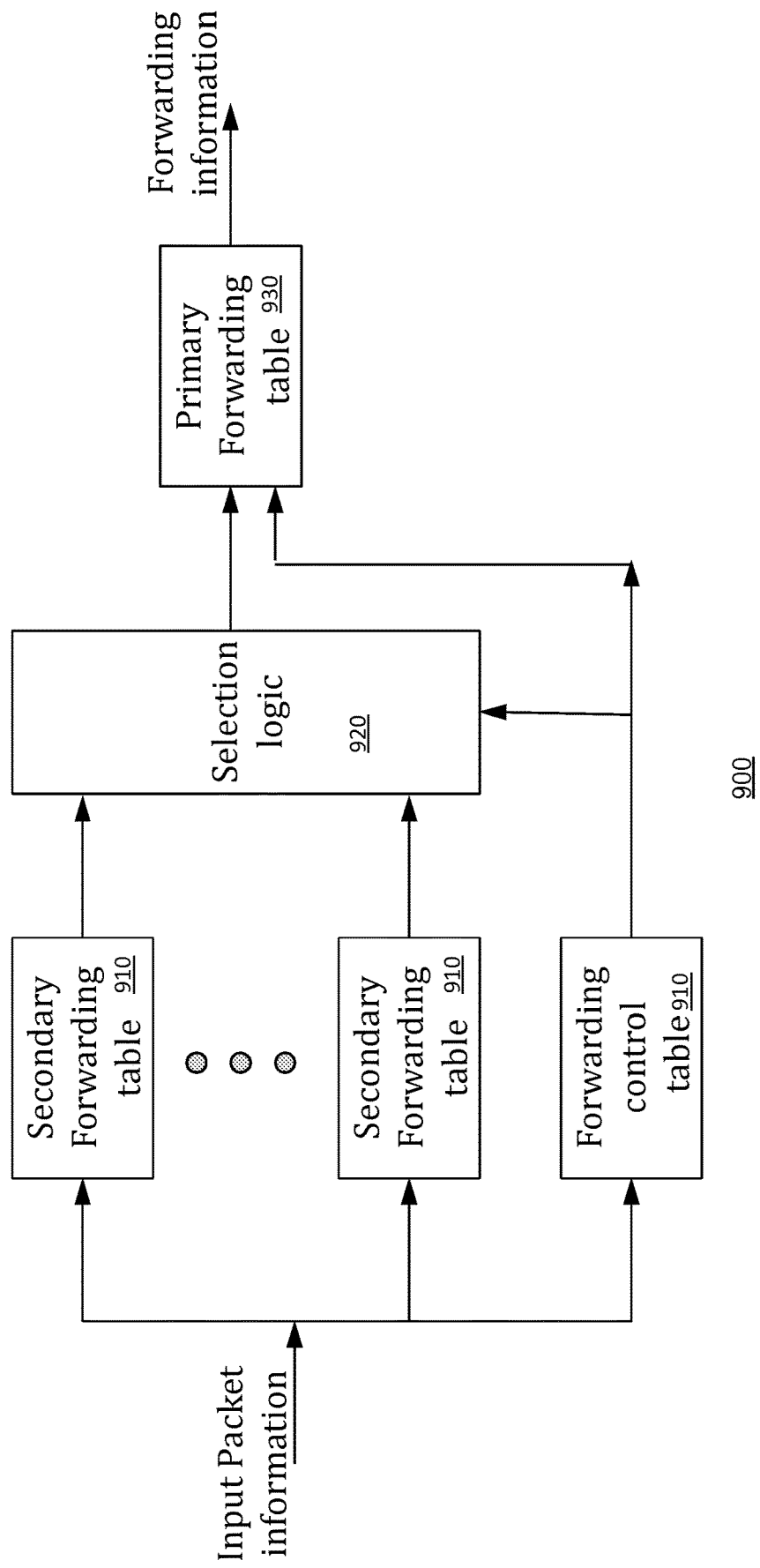
FIG. 9 illustrates an Ethernet flow steering engine according to an embodiment of the invention.

FIG. 9 illustrates Ethernet Flow Steering engine 900 according to an embodiment of the invention.

The Flow steering engine receives the parser information and use it to select where to forward the packet based on the parsing information. It selects the target CPU/OS/Queue. The forwarding control tables (910) gets the protocol information (From the parser) as an input address and the output of these tables are sets of control signals which controls which are used by the selection logic (920) as input to the selection MUXs to select the target CPU and target queue for each packet.

The output of the control tables (910) can also be used for other acceleration engines such as CRC offload to indicate how to process the received packet.

Tx Operation

When the host has an Ethernet packet for transmission it prepares a list of M2S Descriptors and writes them to the selected Tx descriptor ring of the M2S UDMA. Each packet can be represented by one or more descriptors. The packet can include two types of descriptors: buffer descriptors and metadata descriptors. The buffer descriptor includes control information, metadata and a 64-bit pointer to the data buffer.

The metadata descriptor includes control information and metadata that can be used for processing the packet.

The UDMA forwards the metadata and the packet data to the Ethernet controller through the stream interface.

The Ethernet controller performs the following operations in the Tx data path.

Tx packet parsing is based on descriptor information.

The software driver writes the parsing parameters and forwarding information in the metadata of the first buffer descriptor (first buffer descriptor, Word_1_metadata[31:0]).

An additional metadata descriptor can be used to write additional parsing and forwarding information for a packet. When the metadata section in the buffer descriptor is not sufficient, the driver prepares these metadata descriptors before the buffer descriptors.

The Ethernet controller stores the last Tx parsing information for each queue (from each UDMA). This information can be used for the following packets that don't include metadata descriptors. (This mode of operation reduces the number of descriptors used when the same metadata is used for consecutive packets).

TX Parsing Engine

The TX Parsing engine receives the metadata information forwarded from the buffer and metadata descriptors, It has a cache memory per TX Queue (for example the queues of FIGS. 2A and 2B) to store the information received from the application in the metadata, the software can modify this memory through register file access or using the M2S metadata descriptors.

This feature can offload the software when transmitting multiple packets in the same queue with the same characteristics, in this case, the software only need to initialize this memory for the first transmitted packet (using metadata descriptor) and the same commands and offsets will be used for the consecutive packets which will only include buffer descriptors.

Ethernet Parsing Engine (EPE) 121

The Ethernet Parsing Engine (EPE) performs packet parsing to detect packet type, detect all headers (and their offsets) and forward all parsing information to the following processors.

RX Parser

The Parsing engine performs packet parsing to detect the protocol fields and information of the packet. The parser is configurable and can detect up to 32 pre-configured protocols.

The parser engine implements multistage parsing engines to detect tunneling protocol. When tunneling is detected, the information of the outer packet is stored and the next stage of parsing is activated, the next stage parse the inner packet as if it was a standalone packet and can detect any preconfigured protocol.

The parsing information for both outer and inner header is stored and forwarded to the flow steering engine to determine the target queue/host and is forwarded to the software driver through the S2M completion metadata.

The parsing engine starts with an initial configuration and search for configurable data at a configurable offset in the packet. The data shift register is loaded until the selected offset is reached and then the selected data is compared to the preconfigured data. When a match is detected, the command output for this match is used for further processing. The command data includes information about the detected protocol and commands for the next step.

Once a protocol has been detected with end_of_parsing asserted in the command data, the parsing engine completes its operation and forwards the parsed data to the next engine.

The software driver performs the configuration of the compare logic and command output to detect L2/3/4 protocol detection and generate the output parsing information.

FIG. 3 illustrates EPE 121 according to an embodiment of the invention.

EPE 121 includes distribution module 271, multiple interleaved sequences of configurable parsing engines and concatenating modules and an aggregation module 272 that collects the output from the multiple interleaved sequences.

FIG. 3 illustrates J interleaved sequences, each includes K concatenating modules and K configurable parsing engines. J and K are positive integers.

The notation 280(k,j) refers to the k'th configurable parsing engine of the j'th interleaved sequence (k ranges between 1 and K while j ranges between 1 and J). FIG. 3 illustrates configurable parsing engines 280(1,1)-280(K,J).

The notation 290(k,j) refers to the k'th concatenating module of the j'th interleaved sequence (k ranges between 1 and K while j ranges between 1 and J). FIG. 3 illustrates concatenating module 290(1,1)-290(K,J).

The distribution module may be configured to distribute information units between the multiple interleaved sequences of configurable parsing engines and concatenating modules. It may apply load balancing or other considerations.

Different portions of an information unit are processed by different configurable parsing engines of a certain interleaved sequence.

At least one configurable parsing engine is configured to (a) process of a portion of the information unit in response to a previous processing result provided from a previous configurable parting engine; and to (b) generate a current processing result to be used by a next configurable parsing engine. The current processing result comprises a command directed to the next configurable parsing engine. A current processing result may be used by anther module of a communication controller. The current processing result may be indicative of an offset to a header length indicator included in a portion of the information unit to be processed by the next configurable parsing engine.

FIG. 4 provides an example of a processing operation of an information unit that is a TCP/IP frame 320 that is processed by multiple configurable parsing engines.

Each configurable parsing engine may be configured to be configured by receiving information unit portion limit metadata indicative of a location of an information unit portion to be processed by the configurable parsing engine.

Each configurable parsing engine may be configured to be configured by receiving processing metadata indicative of a manner in which the information unit portion should be processed by the configurable parsing engine. The system according to claim 1, wherein different configurable parsing engines are configured to process information unit portions that relate to different protocol suit levels.

The TX Direction

All the parsing information is received from the descriptor or pre-configured per queue.

The controllers holds a per queue database with all the parsing information, this information can be dynamically updated by the software driver using metadata descriptor at the head of the transmitted packet or configured using register access.

The controller can also store the metadata information from one packet to be used for following packets, this feature can be used by the software driver when it send multiple packets with the same characteristics to reduce CPU load and memory access load.

In the Rx direction,

The parsing is performed by the hardware, based on received data, pre-configured detected protocol values and offsets.

The parsing engine is preconfigured, it detects the received protocols and write them to the next parsing engine, the detected protocols are also written into the completion descriptor and can be used by the software to detect the L3 and L4 protocols and offsets without doing additional memory access for parsing the packet.

The protocols are forwarded using protocol_index number, which is configured for each detected protocol.

The protocol_index can have the following values:

TABLE 1

Protocol_index example

| Protocol_index value | Detected protocol | Comments |
| --- | --- | --- |
| 0 | Not Used | Protocol not detected |
| 1 | mac_802_3 | Standard 802.3 packet |
| 2 | mac_802_3_ms_8 | Standard 802.3 packet, with MACSEC (8 bytes header) |
| 3 | mac_802_3_ms_16 | Standard 802.3 packet, with MACSEC (16 bytes header) |
| 4 | vlan_1_1 | First VLAN detected (one type, for example 0x8100) |
| 5 | vlan_1_2 | First VLAN detected (one type, for example 0x9100) |
| 6 | vlan_2_1 | Second VLAN detected (one type, for example 0x8100) |
| 7 | vlan_2_2 | Second VLAN detected (one type, for example 0x9100) |
| 8 | ipv4_frag_check | Internal, IPv4 detected |
| 9 | ipv4_no_frag | IPv4 without fragmentation |
| 10 | ipv4_frag | IPv4 with fragmentation |
| 11 | ipv6 | IPv6 |
| 12 | TCP | TCP |
| 13 | UDP | |
| 14 | GRE | GRE |
| 15 | IPv6_over_IPv4 | IPv6 over IPv4 detected |
| 16 | LLC | |
| 31 | not detected | Protocol not detected |

The Ethernet parsing Engine (EPE) performs receive packet parsing to packet type, detect all headers (and their offsets) and forward all parsing information to the next engines in the Ethernet controller pipeline.

The detected L3 and L4 protocols are also written into the Rx Completion Descriptor, and can be used by the software to detect the L3 and L4 protocols and offsets without doing additional memory access for parsing the packet. The EPE can be configured to recognize proprietary protocols that typical Ethernet Switches or FPGA would add to the packet.

The Parser database includes 3 sets of memory structures (see FIG. 4):

a. Compare logic array 331 an array of values, masks and commands. each line is used to detect a preconfigured protocol.

b. Parser control table 332—a table which includes commands how to process the detected protocol and how to generate the inputs for the next iteration.

c. Parse result vector 333—stores all the parsed information that was saved during the parsing process The parser works in iterative mode, each iteration performs the following operations:

A 16-bit protocol field is selected from the packet (the offset to this field is the result of the previous iteration).

The protocol field along with other result fields from the previous iteration are used as an input to the compare logic array.

The output of the compare logic array is the matching line number which is used as an address to read the parsing command from the parse control table.

Note that if there is no match, the last line is saved as a default for undetected protocols.

The data read from the parse control table is used to process the header, save parsing information to the parse result vector and generate inputs for the next parsing iteration.

Note—the parsing command from the parse control table includes an "end of parse" bit which indicates the end of the parsing process.

The output of the parser is a parse result vector which includes all the parsing information (for example, MAC DA, MAC SA, VLAN tag, IP-SIP, IP-DIP, L3 protocol index, L4 protocol index), this information is used by the forwarding engine and some of the fields are forwarded to the software driver in the metadata fields of the descriptor.

Referring to FIG. 4—an information unit 320 is processed by three configurable parsing engines during first, second and third iterations 311, 312 and 313. The information unit includes the following fields: DA 321, SA 322, VLAN 323, ETYPE 324, 1Pv4 Header 325, TCP Header 326 and payload 327.

DA 321 and SA 322 are detected during processing executed during the first iteration and are sent to the parse result vector 333. The first iteration includes determining an offset (Offset to the next protocol=12) to the next protocol (a part of the current processing result) that is fed (by a first concatenating module) a next (second) configurable parsing engine. The first iteration may also include retrieving a current header length from the parser control table 332.

VLAN information is detected during processing executed during the second iteration and it is sent to the parse result vector 333. The second iteration includes receiving the offset and/or current head length calculated during the first iteration and processing the VLAN information. The second iteration also includes determining an offset (Offset to the next protocol=2) to the next protocol (a part of the current processing result of the second iteration) that is fed (by a second concatenating module) a next (third) configurable parsing engine. The second iteration may also include retrieving a current header length from the parser control table 332.

1Pv4 header 325 is detected during processing executed during the third iteration and it is sent to the parse result vector 333. The third iteration includes receiving the offset and/or current head length calculated during the second iteration and processing the P1v4 header 325. The third iteration also includes determining an offset (Offset to the next protocol=9) to the next protocol (a part of the current processing result of the third iteration) that is fed (by a third concatenating module) a next (fourth) configurable parsing engine. The third iteration may also include retrieving a current header length from the parser control table 332.

Figure 5:
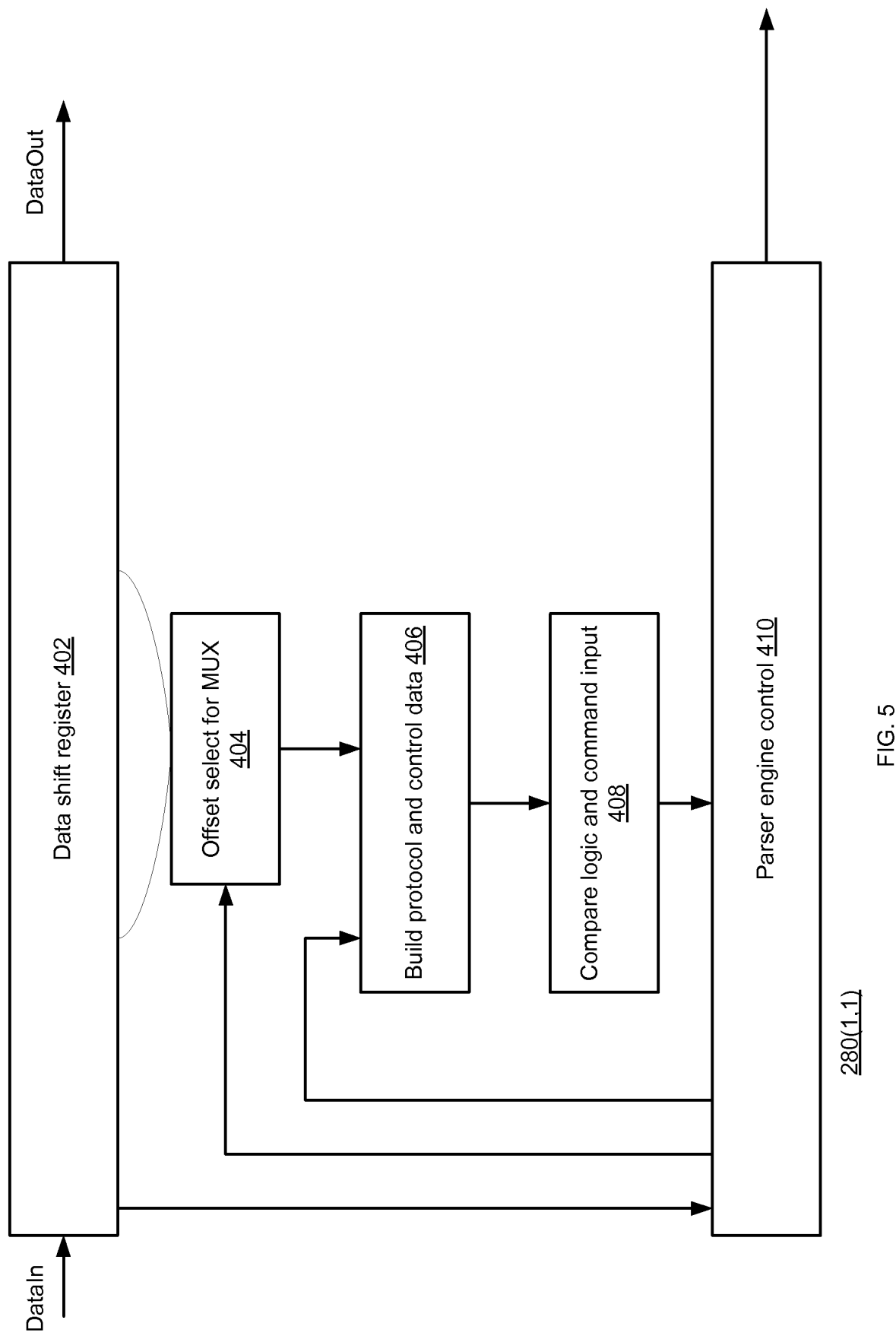
FIG. 5 illustrates a configurable parsing engine 280(1,1) according to an embodiment if the invention.

FIG. 5 illustrates a configurable parsing engine 280(1,1) according to an embodiment if the invention.

The configurable parsing engine 280(1,1) includes parser engine control module 410, compare logic and command input module 408, built protocol and control data module 406, offset select for MUX 404 and data shift register 420.

The data memory (402) stores the packet information (FIG. 4, 320), the Offset select MUX (404) selects the data from the current offset in the packet payload (320) and build the input information (406) which include protocol data and control information to the compare logic and (408) which includes the protocol value table (331) and parse control table (332), the output from this tables is forwarded to the parse engine control (410) which generates the information for the next iterations and the output for the next engine and the result vector (333).

In the transmit (Tx) direction, all the parsing information is coming from the Tx Descriptor or pre-configured per queue.

The Ethernet controller holds a per-queue database with all the parsing information: this information can be dynamically overridden and/or updated by the software driver using metadata Descriptor at the head of the transmitted packet or configured using register access.

The Ethernet controller can also store the metadata information from one transmitted packet to be used for following packets, this feature can be used by the software driver when it is transmitting multiple packets with the same characteristics to reduce CPU load and memory access.

In the advanced Ethernet controller, tunnel packets can be detected and both outer and inner header can be parsed.

The inner packet parsing is performed by a second parsing engine which start header parsing where the first parser detected a tunneling protocol, the first parser forward the initial offset and protocol which is used for the first iteration of the second parser. The first parsing engine can be a configurable parsing engine and the second parsing engine can be a configurable parsing engine that follows it (as illustrated, for example, in FIG. 3).

The parsing engine performs packet parsing to detect the protocol fields and information of the packet. The parser is configurable and can detect up to 32 pre-configured protocols.

The parser engine implements multistage parsing engines to detect tunneling protocol. When tunneling is detected, the information of the outer packet is stored and the next stage of parsing is activated, the next stage parse the inner packet as if it was a standalone packet and can detect any preconfigured protocol.

The parsing information for both outer and inner header is stored and forwarded to the flow steering engine to determine the target queue/host and is forwarded to the software driver through the S2M completion metadata.

The parsing engine starts with an initial configuration and search for configurable data at a configurable offset in the packet. The data shift register is loaded until the selected offset is reached and then the selected data is compared to the preconfigured data. When a match is detected, the command output for this match is used for further processing. The command data includes information about the detected protocol and commands for the next step.

Once a protocol has been detected with end_of_parsing asserted in the command data, the parsing engine completes its operation and forwards the parsed data to the next engine, the number of iteration is configurable and can't exceed 32 iterations. The software driver performs the configuration of the compare logic and command output to detect L2/3/4 protocol detection and generate the output parsing information using the XXX API and YYY data structuring.

TABLE 2

Compare logic array

| Name | Size [bits] | Description |
| --- | --- | --- |
| Valid | 1 | Indicates that this line is valid and can be sued for comparison |

TABLE 2-continued

Compare logic array

| Name | Size [bits] | Description |
|---|---|---|
| Data_1 | 16 | Data for logic operation |
| Mask_1 | 16 | Mask for logic operation |
| CMD_1 | 2 | Logic operation:<br>00 - compare<br>01 - <=<br>10 - >=<br>11 - ignore |
| Branch_id | 6 | Branch_id value for comparison, Branch_id data is output from previous iteration.<br>The Branch_id can be used to create branches within the protocol detection process (for example to distinguish between first and second VLAN detection)<br>Branch_id field is saved between iteration and each iteration command can set/clear each bit separately |
| Branch_id_mask | 6 | Mask for the Branch_id comparison |
| Stage | 3 | Stage value for comparison, Stage data is output from previous iteration.<br>The Stage can be used to mark the protocol layer that is currently being processed and to distinguish between protocol values that are used in each layer.<br>The stage field is set in each iteration. |
| Stage_mask | 3 | Mask for the Stage comparison |
| Output_protocol_index | 5 | This is the output of the compare logic, it is used as an address to the parse control table and used as an value to mark and signal protocols in the system. |

TABLE 3

Parse control table

| Name | Size [bits] | Units | Description |
|---|---|---|---|
| Next protocol command<br>Indicates how to generate the 16-bits of protocol data for the next iteration comparison | | | |
| Offset_to_next_protocol | 6 | bytes | Offset to the location of the next protocol data<br>The offset is relative to the start location of the current header<br>(for example, for IPv4, the offset is 7) |
| Next_protocol_avail | 1 | N/A | Indicates that the next protocol data is available in the current header<br>(for example, for IPv4, the protocol is available, '1') |
| Default_next_protocol | 5 | N/A | Protocol index which is used as the next protocol index (for next iteration) in case that Next_protocol_avail = 0, and the next protocol is not available inside the current header |
| Prot_wr | 1 | N/A | Indicates if the protocol index should be written into the parse result vector<br>(for example, for IPv4, this field is '1', the protocl index will be written as the L3 protocol index) |
| Prot_wr_pointer | 10 | bytes | Offset where to write the protocol index in the parse result vector |
| Select_prot_index | 1 | N/A | Selects which protocol index to write in the parse result vector.<br>0 - next protocol index<br>1 - current protocol index |
| Select_header_length | 1 | N/A | Selects which header length to write in the parse result vector.<br>0 - next header length<br>1 - current header length |
| Select_header_offset | 1 | N/A | Selects which header offset to write in the parse result vector.<br>0 - next header offset<br>1 - current header offset |
| Data command 1<br>Select data from the current parsed header and write it to the parse result vector<br>(for example when parsing IPv4 header, write the source IP - SIP and destination IP - DIP into the parse result vector) | | | |
| Offset_to_data_1 | 9 | bits | Offset to the location of the data that should be stored,<br>The offset is relative to the start location of the current header<br>(for example, for IPv4, to store the SIP and DIP, the offset is 12) |
| Data_size_1 | 9 | bits | Size of the field that should be written to the parse result vector<br>(for example, for IPv4, to store the SIP and DIP, the size is 8) |

TABLE 3-continued

Parse control table

| Name | Size [bits] | Units | Description |
|---|---|---|---|
| Data_wr_1 | 1 | N/A | Indicates if the data should be written into the parser result vector |
| Data_wr_pointer_1 | 10 | bytes | Offset where to write the data in the parse result vector |
| Data command 2 | | | |
| Same as data command 1, allows to write additional field per header into the parse result vector | | | |
| Offset_to_data_2 | 9 | bits | Offset to the location of the data that should be stored, The offset is relative to the start location of the current header |
| Data_size_2 | 9 | bits | Size of the field that should be written to the parse result vector |
| Data_wr_2 | 1 | N/A | Indicates if the data should be written into the parser result vector |
| Data_wr_pointer_2 | 10 | bytes | Offset where to write the data in the parse result vector |
| Header length command | | | |
| Indicates how to calculate the length of the current header (used as an offset for the next header) | | | |
| The header length information can come from the current parsed header or the parse control table | | | |
| Offset_to_header_len | 8 | bits | Offset to the location of the header length in the current header, The offset is relative to the start location of the current header. (for example, for IPv4, the offset is 4) |
| Header length size | 5 | bits | Size of the header length field (for example, for IPv4, the size is 4) |
| Header_length_units | 3 | Bit shift | Indicates how to shift the header length value from the packet to get header length in units of bytes (for example, for IPv4, shift will be 2, multiplication of 4 because the IHL is in 32-bits words) |
| Header_length_cmd | 4 | N/A | Command how to calculate the header length: Bit [3] - reserved Bit [2] - indicates if the default header length from the parse control table should be added or not: 0 - add default Bits [1:0] - header length selector: 00 - use 0 01 - use from packet data 10 - use the packet header length data as address to header length table 1 11 - use the packet header length data as address to header length table 2 (if bits [3:0] == '0000' than the default header length is used) (for example, for IPv4, the configuration is '0001') (for example, for VLAN, the configuration is '0000) |
| Default_header_length | 8 | bytes | Default header length value, Used based on the Header_length_cmd command field. (for example, for IPv4, the default header length is 0) (for example, for VLAN, the default header length is 4) |
| Parse control | | | |
| Commands and controls for the parser operation | | | |
| End_of_parsing | 1 | N/A | End of parsing indication 1 - Indicates that this is the last header that should be parsed |

TABLE 3-continued

Parse control table

| Name | Size [bits] | Units | Description |
|---|---|---|---|
| Next_stage | 3 | N/A | Next_stage value for the next parsing iteration |
| Next_branch_id_set | 6 | N/A | Indicates how to change the Branch_id field for the next iteration<br>The Branch_id field is saved between iteration and each iteration can change each bit of this field.<br>The command is per bit<br>0 - don't change this bit<br>1 - change this bit to the value indicated in Next_branch_id_val |
| Next_branch_id_val | 6 | N/A | Indicated the value that should be used if the Next_branch_id_set is '1' (per bit) |
| Control_bit_set | 8 | N/A | Indicates how to change the control field.<br>The control field is saved between iteration and each iteration can change each bit of this field.<br>The command is per bit<br>0 - don't change this bit<br>1 - change this bit to the value indicated in Next_branch_id_val<br>At the end of the parsing, The control field (8 bits) is written into the result vector.<br>(for example, A bit can be set in the control field to indicate if a VLAN is detected) |
| Control_bit_val | 8 | N/A | Indicated the value that should be used if the Control_bit_set is '1' (per bit) |
| Wr_header_length | 1 | N/A | Indicates if the header length should be written into the parse result vector<br>(for example, for IPv4, this field is '1', the header length will be written as the L3_header_len) |
| Header_length_pointer | 10 | bytes | Offset where to write the header length in the parse result vector |
| Wr_header_offset | 1 | N/A | Indicates if the header offset should be written into the parse result vector<br>(for example, for IPv4, this field is '1', the header offset will be written as the L3_offset) |
| Header_offset_pointer | 10 | bytes | Offset where to write the header offset in the parse result vector |
| Next_parse_en | 1 | N/A | Indicates if the next parser is enabled<br>This enables the tunnelled packet parsing, when tunnelling protocol is detected this bit enables the next parser operation to parse the inner header of the packet.<br>Note: This is only applicable for advanced Ethernet controller |

TABLE 4

Parser output, Parse result vector

| Name | Width [bits] | Description |
|---|---|---|
| input_prot_index | 5 | Input for the next parsing engine. First protocol for detection. |
| input offset | 8 | Input for the next parsing engine. Offset for start of parsing. |
| input parse_en | 1 | Input for the next parsing engine. Enable parsing. |
| ctrl_bits | 8 | Control bits:<br>0    VLAN 1 exists<br>1    VLAN 2 exists<br>2    Tunnel detection<br>3    IPv4 fragmentation<br>4    L4 found<br>5    Reserved<br>6    Reserved<br>7    Packet drop |
| p_l3_prot_index | 5 | L3 Protocol index |
| p_l4_prot_index | 5 | L4 Protocol index |
| p_da | 48 | MAC DA |
| p_sa | 48 | MAC SA |
| p_vlan_1_data | 16 | First VLAN tag |
| p_vlan_2_data | 16 | Second VLAN tag |
| p_l3_sip | 128 | L3 Source IP address |
| p_l3_dip | 128 | L3 destination IP address |
| p_l4_src_port | 16 | L4 source port |
| p_l4_dst_port | 16 | L4 destination port |
| P_l3_offset | 16 | Offset to the L3 header |
| P_l3_header_length | 16 | Length of the L3 header |
| P_l4_offset | 16 | Offset to the L4 header |
| P_l4_header_length | 16 | Length of the L4 header |
| P_l3_priority | 8 | L3 priority value (IP DSCP/TOS) |

The next table shows the pre-configured Protocol_Index values that is defined the default drivers for the Ethernet Controller. This is configurable and can be written:

TABLE 5

Protocol_index example

| Protocol_index value | Detected protocol | Comments |
|---|---|---|
| 0 | Not Used | Protocol not detected |
| 1 | mac_802_3 | Standard 802.3 packet |
| 2 | mac_802_3_ms_8 | Standard 802.3 packet, with MACSEC (8 bytes header) Only used with Advanced Ethernet Controller |
| 3 | mac_802_3_ms_16 | Standard 802.3 packet, with MACSEC (16 bytes header) My be used with Advanced Ethernet Controller but this is not necessarily so |
| 4 | vlan_1_1 | First VLAN detected (with preconfigured VLAN EthernetType #1, for example 0x8100) |
| 5 | vlan_1_2 | First VLAN detected (with preconfigured VLAN EthernetType #2, for example 0x9100) |
| 6 | vlan_2_1 | Second VLAN detected (with preconfigured VLAN EthernetType #1, for example 0x8100) |
| 7 | vlan_2_2 | Second VLAN detected (with preconfigured VLAN EthernetType #12, for example 0x9100) |
| 8 | ipv4_frag_check | Internal, IPv4 detected |
| 9 | ipv4_no_frag | IPv4 without fragmentation |
| 10 | ipv4_frag | IPv4 with fragmentation |
| 11 | ipv6 | IPv6 |
| 12 | TCP | TCP |
| 13 | UDP | |
| 14 | GRE Tunnel | GRE Tunnel Only used with Advanced Ethernet Controller |
| 15 | IPv6_over_IPv4 Tunnel | IPv6 over IPv4 Tunnel Only used with Advanced Ethernet Controller |
| 16 | Ethernet with LLC SNAP encapsulation | |
| 31 | not detected | Protocol not detected |

Note: The protocol_index values are configurable, the parser can be configured to map any detected protocol to any protocol_index value, see compare logic array database description above. Note that the software driver configures the compare logic array and the parser control table with a default set of protocols during initialization.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit bbelements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A packet processing method comprising:
   receiving a packet;
   performing a packet parsing process including:
     selecting a protocol field from the packet;
     performing a comparison of the selected protocol field with comparison data in a compare logic array to output a protocol index;
     using the protocol index as an address to read parsing command information from a parse control table; and
     generating parse result based on the parsing command information; and
   storing a parse result vector based on the parse result in a completion descriptor for a forwarding engine.

2. The method of claim 1, wherein the packet includes multiple protocols, and the packet parsing process is performed iteratively for the multiple protocols to derive the parse result vector.

3. The method of claim 2, wherein the parsing command information includes a next protocol command indicating an offset to a location of a next protocol field in the packet to process.

4. The method of claim 1, wherein the parse result vector includes protocol header data, and the parsing command information includes a data command indicating an offset to a location of protocol header data in the packet, and a size of the protocol header data.

5. The method of claim 4, wherein the data command further includes a write pointer indicating an offset in the parse result vector to write the protocol header data.

6. The method of claim 1, wherein the parsing command information includes a header length command to calculate a length of a current protocol header.

7. The method of claim 1, wherein the parsing command information includes an end-of-parsing indicator indicating whether a current protocol header is a last header to process.

8. The method of claim 1, wherein the parse result vector includes a level 3 (L3) protocol index value and a level 4 (L4) protocol index value.

9. The method of claim 8, wherein the parse result vector further includes a L3 source address, a L3 destination address, a L4 source port, and a L4 destination port.

10. The method of claim 1, wherein the packet parsing process is performed iteratively, and wherein a destination address and a source address are obtained by a first iteration of the packet parsing process, virtual local area network (VLAN) information is obtained by a second iteration of the packet parsing process, and an internet protocol (IP) header is obtained by a third iteration of the packet parsing process.

11. An integrated circuit device comprising:
   a configurable parsing engine having:
     a data register operable to store a packet;
     an offset selector operable to select a protocol field from the packet;
     compare and command logic operable to perform a comparison of the selected protocol field with comparison data in a compare logic array to generate a protocol index, and use the protocol index as an address to read parsing command information from a parse control table; and
     parser engine control logic operable to generate a parse result for a parse result vector based on the parsing command information.

12. The integrated circuit device of claim 11, wherein the packet includes multiple protocols, and wherein the integrated circuit device includes a plurality of configurable parsing engines to process the multiple protocols of the packet.

13. The integrated circuit device of claim 12, wherein the parsing command information includes a next protocol command indicating an offset to a location of a next protocol field in the packet to be processed by a next configurable parsing engine of the plurality of configurable parsing engines.

14. The integrated circuit device of claim 11, wherein the parse result vector includes protocol header data, and the parsing command information includes a data command indicating an offset to a location of protocol header data in the packet, and a size of the protocol header data.

15. The integrated circuit device of claim 14, wherein the data command further includes a write pointer indicating an offset in the parse result vector to write the protocol header data.

16. The integrated circuit device of claim 11, wherein the parsing command information includes a header length command to calculate a length of a current protocol header.

17. The integrated circuit device of claim 11, wherein the parsing command information includes an end-of-parsing indicator indicating whether a current protocol header is a last header to process.

18. The integrated circuit device of claim 11, wherein the parse result vector includes a level 3 (L3) protocol index value and a level 4 (L4) protocol index value.

19. The integrated circuit device of claim 18, wherein the parse result vector further includes a L3 source address, a L3 destination address, a L4 source port, and a L4 destination port.

20. The integrated circuit device of claim 11, further including a forwarding engine to steer the packet to a processor based on the parse result vector.

\* \* \* \* \*